(12) United States Patent
Rowe et al.

(10) Patent No.: US 7,918,186 B2
(45) Date of Patent: Apr. 5, 2011

(54) GRASS-GROWING DEVICES FOR PET FOUNTAINS

(75) Inventors: Sean Michael Rowe, Reno, NV (US); John Michael Lipscomb, Cedarburg, WI (US)

(73) Assignee: Veterinary Ventures, Inc., Knoxville, TN (US)

( * ) Notice: Subject to any disclaimer, the term of this patent is extended or adjusted under 35 U.S.C. 154(b) by 376 days.

(21) Appl. No.: 11/406,861

(22) Filed: Apr. 18, 2006

(65) Prior Publication Data

US 2006/0230676 A1 Oct. 19, 2006

Related U.S. Application Data

(60) Provisional application No. 60/672,596, filed on Apr. 18, 2005.

(51) Int. Cl.
 *A01G 9/02* (2006.01)
 *A01G 31/00* (2006.01)

(52) U.S. Cl. ............... 119/246; 47/59 R; 47/66.7; 47/64; 47/61; 47/62 R; 119/247; 119/72; 119/74

(58) Field of Classification Search ................... 47/59 R, 47/64, 62 R, 63, 60, 65.5, 66.6, 66.7, 67, 47/68, 78, 61; 119/246, 247, 253, 72, 74
See application file for complete search history.

(56) References Cited

U.S. PATENT DOCUMENTS

| | | | | |
|---|---|---|---|---|
| 2,937,617 | A * | 5/1960 | Brody et al. | 119/51.5 |
| 3,467,609 | A * | 9/1969 | Adams et al. | 47/64 |
| 4,124,953 | A * | 11/1978 | Patton | 47/69 |
| 4,180,941 | A * | 1/1980 | Korematsu | 47/14 |
| 4,192,097 | A * | 3/1980 | Smith | 47/59 R |
| 4,299,055 | A * | 11/1981 | Dziewulski et al. | 47/71 |
| D279,278 | S * | 6/1985 | Pink | D11/143 |
| 4,880,133 | A * | 11/1989 | Cullinane | 220/737 |
| 4,976,064 | A * | 12/1990 | Julien | 47/63 |
| 5,390,443 | A * | 2/1995 | Emalfarb et al. | 47/67 |
| 5,598,662 | A * | 2/1997 | Droste | 47/39 |
| 5,637,361 | A * | 6/1997 | Scheurich | 428/13 |
| 5,983,562 | A * | 11/1999 | Lai | 47/61 |
| 6,023,884 | A * | 2/2000 | Yanohara | 43/132.1 |
| 6,173,530 | B1 * | 1/2001 | Holt | 47/66.1 |
| 6,247,268 | B1 * | 6/2001 | Auer | 47/62 R |
| 6,748,699 | B2 * | 6/2004 | Taylor | 47/79 |
| 6,843,021 | B1 * | 1/2005 | Huang | 47/63 |
| 7,036,273 | B2 * | 5/2006 | Valiquette et al. | 47/80 |
| 2004/0216373 | A1 * | 11/2004 | Kindley | 47/59 R |
| 2005/0076565 | A1 * | 4/2005 | Terrell | 47/65.8 |
| 2005/0274073 | A1 * | 12/2005 | Brooke et al. | 47/59 R |
| 2006/0283082 | A1 * | 12/2006 | Stevenson | 47/70 |

FOREIGN PATENT DOCUMENTS

GB 2045044 A * 10/1980

\* cited by examiner

*Primary Examiner* — Andrea M Valenti
(74) *Attorney, Agent, or Firm* — Pitts & Brittian, P.C.

(57) ABSTRACT

Disclosed herein are exemplary embodiments of various grass-growing devices. In one nonlimiting embodiment, for example, a device for growing grass in a container that provides water to a household pet is disclosed. The device includes a basket that is configured for insertion into the container. The basket comprises one or more apertures that allow for fluid movement through the basket. The device further includes a seed-holding unit. The seed-holding unit of this embodiment comprises a housing in which one or more grass seeds can be placed.

15 Claims, 14 Drawing Sheets

GRASS-GROWING DEVICES FOR PET FOUNTAINS

CROSS-REFERENCE TO RELATED APPLICATIONS

This application claims the benefit of U.S. Provisional Application No. 60/672,596 filed on Apr. 18, 2005, which is hereby incorporated herein by reference.

FIELD

This application relates generally to accessories that can be used in water containers for household pets. In particular, this application relates to devices for growing grass that can be placed in the interior of a pet's water container.

BACKGROUND

The relationship between a pet and its owner can be extremely strong and involve mutual feelings of love and devotion. On account of this relationship, pet owners often search for ways to improve the lives of their beloved pets. For example, many pet owners desire ways to promote their pets' health through an improved diet. Many pet owners therefore grow and feed their pets specialized grasses that contain important vitamins and help improve digestion. For example, some cat owners grow grass (sometimes called "kitty grass"), which can help satisfy a cat's natural craving for grass, provide nutrients, and control hair balls by acting as an emetic.

Growing kitty grass, however, can be inconvenient and messy. Grass for a pet is typically grown in a pot filled with soil and grass seeds. Just like any other houseplant, the pot of grass seeds must be monitored and watered. Moreover, the pot is often located on the floor or in another unsightly location. Further, to eat the grass, a pet typically pulls at a leaf of grass in order to tear it away from its potted foundation. This action often dislodges the grass seeds from the pot and can cause soil to be spilled.

Accordingly, there is a need for improved devices for growing grass for consumption by household pets.

SUMMARY

Various grass-growing devices are described and claimed herein. For example, the grass-growing devices can facilitate growth of grass for cats or other household pets.

In one exemplary embodiment, a device for growing plants is disclosed. This embodiment includes a basket configured for insertion into a container that provides water to a household pet. The basket of this embodiment comprises one or more apertures that allow for fluid movement into the basket. This embodiment further includes a seed-holding unit, which comprises a housing into which seeds can be placed. The basket can further include a mechanism for securing the basket to a rim of the container. The mechanism can comprise, for example, a projection and a flange extending from an upper edge of the basket. In one particular implementation, the flange includes a protrusion configured to engage a lip or bottom edge of the container. In some implementations, at least a portion of the seed-holding unit is integrally formed within the basket. The seed-holding unit can alternatively be configured to be removable from the basket. For instance, the seed-holding unit can be removably attachable to a bottom of the basket (e.g., via a snap-fit mechanism). In certain implementations, the basket and/or the seed-holding unit is at least partially formed from a flexible fabric-like material. The seed-holding unit can also comprise one or more apertures on an upper surface that are sized to allow leaves or blades from the seeds to grow through the apertures but to help prevent passage of at least some of the seeds. In particular implementations, the container can be for cats, and the seeds can be for kitty grass.

In another exemplary embodiment, an apparatus is disclosed that includes a pet fountain having a water receptacle, and a basket that is configured for insertion into the water receptacle and that comprises one or more apertures that allow for fluid movement into the basket. This embodiment can further include a seed-holding portion comprising a housing into which seeds can be placed. In certain implementations, the seed-holding portion is formed integrally within the basket. The basket of this embodiment can include an attachment mechanism configured to secure the basket to a rim of the water receptacle and thereby suspend the basket within an interior of the water receptacle. The pet fountain can include a circulation mechanism for circulating water in the water receptacle.

In another embodiment, a device for growing plants is disclosed. In this embodiment, the device includes a basket comprising one or more apertures that allow for fluid movement into the basket. The device further includes an attachment mechanism configured to secure the basket to a rim of a container and thereby suspend the basket within an interior of the container. In this embodiment, the container is configured to provide fluid to household pets. The device can further include a seed-holding unit dimensioned to fit within the basket and forming a housing into which seeds can be placed. The seed-holding unit can comprise a top portion and a bottom portion coupled to one another and can include one or more apertures. For example, the apertures of the seed-holding unit can comprise apertures on an upper surface dimensioned to allow leaves or blades from the seeds to grow outwardly from the seed-holding unit and to prevent at least some of the seeds from being removed from the seed-holding unit when the leaves or blades are pulled. The apertures of the seed-holding unit can be dimensioned, for example, to provide openings that are smaller than a diameter of at least a majority of the seeds in the seed-holding unit. The apertures can also comprise apertures on a bottom surface of the seed-holding unit dimensioned to allow fluid to pass through the seed-holding unit and to prevent at least some of the seeds from falling out of the seed-holding unit. In some implementations, the seed-holding unit further comprises a fastening mechanism (e.g., a snap-fit mechanism) for securing the seed-holding unit to the bottom of the basket. The basket of this embodiment can be at least partially shaped to complement the interior of the container. For example, the basket can be oblong in shape and comprise two sides having substantially the same radius of curvature as the container. Or, the basket can be substantially circular in shape. In particular implementations, the attachment mechanism can be configured to secure the basket to the rim of the container and comprise one or more projections extending substantially outwardly from an upper edge of the basket and one or more flanges extending substantially downward from corresponding edges of the one or more projections. The flanges can further include respective horizontal flange elements configured to contact a lip or edge of the container. In certain implementations, the apertures of the basket comprise side apertures (e.g., side apertures that extend at least partially up the sides of the basket) and/or bottom apertures. In particular implementations, the container can be for cats, and the seeds can be for kitty grass.

Another exemplary embodiment includes a basket comprising one or more sides that define an interior of the basket.

The basket of this embodiment includes one or more apertures to allow a flow of fluid into the basket to seeds within the interior of the basket. This embodiment further includes a seed barrier comprising one or more walls, wherein the one or more walls include plural apertures to allow leaves or blades from the seeds to grow outwardly from the seed barrier. The plural apertures of the seed barrier can be configured to help prevent passage of at least some of the seeds. In particular implementations, the seed barrier is a perforated screen positioned above the seeds in the basket. The seed barrier can also be part of a seed-holding unit that forms a housing in which the seeds can be enclosed. In some implementations, the seed-holding unit is comprised of a top portion and a bottom portion, and the seed barrier forms at least a part of the top portion. The seed-holding unit can also include an attachment mechanism for attaching the seed-holding unit to the basket. In certain implementations, the basket further comprises a bottom that includes one or more apertures to allow the flow of fluid into the basket but help prevent the seeds from falling out. The basket can include an attachment mechanism for securing the basket to an interior of a pet fountain. Further, the sides of the basket can be formed of a flexible liquid-permeable material or a more rigid material.

Another disclosed embodiment is a device for growing grass in a container that provides fluid to a household pet. This embodiment includes a receptacle configured to hold seeds in an interior of the receptacle, and a seed-securing element configured to fit within the interior of the receptacle. The seed-securing element of this embodiment comprises one or more apertures that allow leaves or blades from the seeds to grow upward through the seed-securing element but that are sized to help prevent at least some of the seeds from being pulled through the seed-securing element. The seed-securing element can be, for example, a screen that can be secured within the interior of the receptacle at a location above the seeds. For instance, the seed-securing element can be secured in the interior of the receptacle by a fastening mechanism (e.g., a fastening mechanism comprising a collar within the receptacle or a fastening mechanism comprising threaded portions on the receptacle and complementary threaded portions on the seed-securing element). In certain implementations, the receptacle is removably attachable to the container. In some implementations, the receptacle comprises one or more apertures dimensioned to allow fluid flow through the receptacle while helping to prevent at least some of the seeds from falling out of the receptacle. The receptacle of this embodiment can be oblong in shape and have at least one side configured to complement curvature of the container. In some implementations, the seed-securing element is part of an integral housing in which the seeds are located.

Another exemplary embodiment is a seed-holding unit for a pet fountain plant-growing device. The seed-holding unit of this embodiment comprises one or more walls at least partially defining a housing into which seeds can be placed. The one or more walls can include plural apertures sized to allow leaves or blades from the seeds to grow outwardly through the apertures but to help prevent pulling of at least some of the seeds through the apertures. The one or more walls can include a perforated screen that includes the plural apertures. The one or more walls can also include a top screen, and the plural apertures can be spaced splits in the top screen. Further, the one or more walls can comprise a top portion wall and a bottom portion wall. The one or more walls can also include plural bottom surface apertures sized to help prevent at least some of the seeds from falling through the bottom surface apertures. In particular implementations, the one or more walls are dimensioned to complement a basket of the pet fountain plant-growing device. Further, the one or more walls can be made of a flexible liquid-permeable material or a more rigid material. The seed-holding unit of this embodiment can further comprise an attachment mechanism (e.g., a snap-fit mechanism) for removably attaching the seed-holding unit to the pet fountain plant-growing device. The seeds in this embodiment can be seeds for kitty grass.

Another disclosed embodiment is a method wherein seed for kitty grass or other plant suitable for consumption by a household pet is received and put into seed packets adapted to fit in a grass-growing device for a pet fountain. The grass-growing device can comprise, for example, a basket comprising one or more sides that define an interior of the basket. The basket can include one or more apertures to allow flow of fluid into the interior of the basket.

The foregoing and other objects, features, and advantages of the disclosed technology will become more apparent from the following detailed description, which proceeds with reference to the accompanying figures.

DETAILED DESCRIPTION

Disclosed below are representative embodiments of various grass-growing devices. The representative embodiments are not intended to be limiting in any way. Instead, the present disclosure is directed toward all novel and nonobvious features, aspects, and equivalents of the embodiments described herein. The disclosed features and aspects of the embodiments can be used alone or in various novel and nonobvious combinations and sub-combinations with one another.

Figure 1:
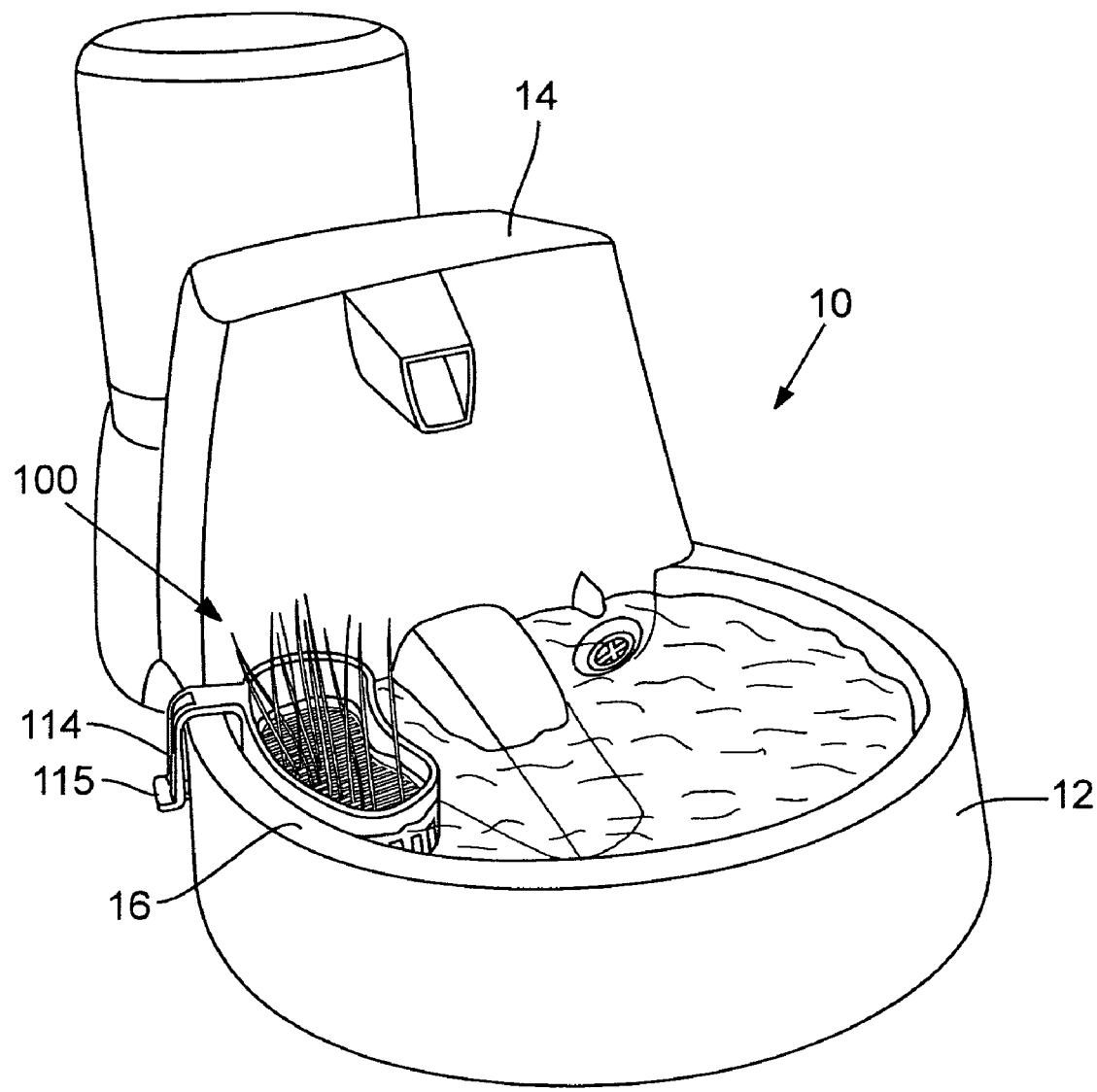
FIG. 1 is a perspective view of a first exemplary embodiment of a grass-growing device removably attached to a rim of a water container for a household pet.
Figure 17:
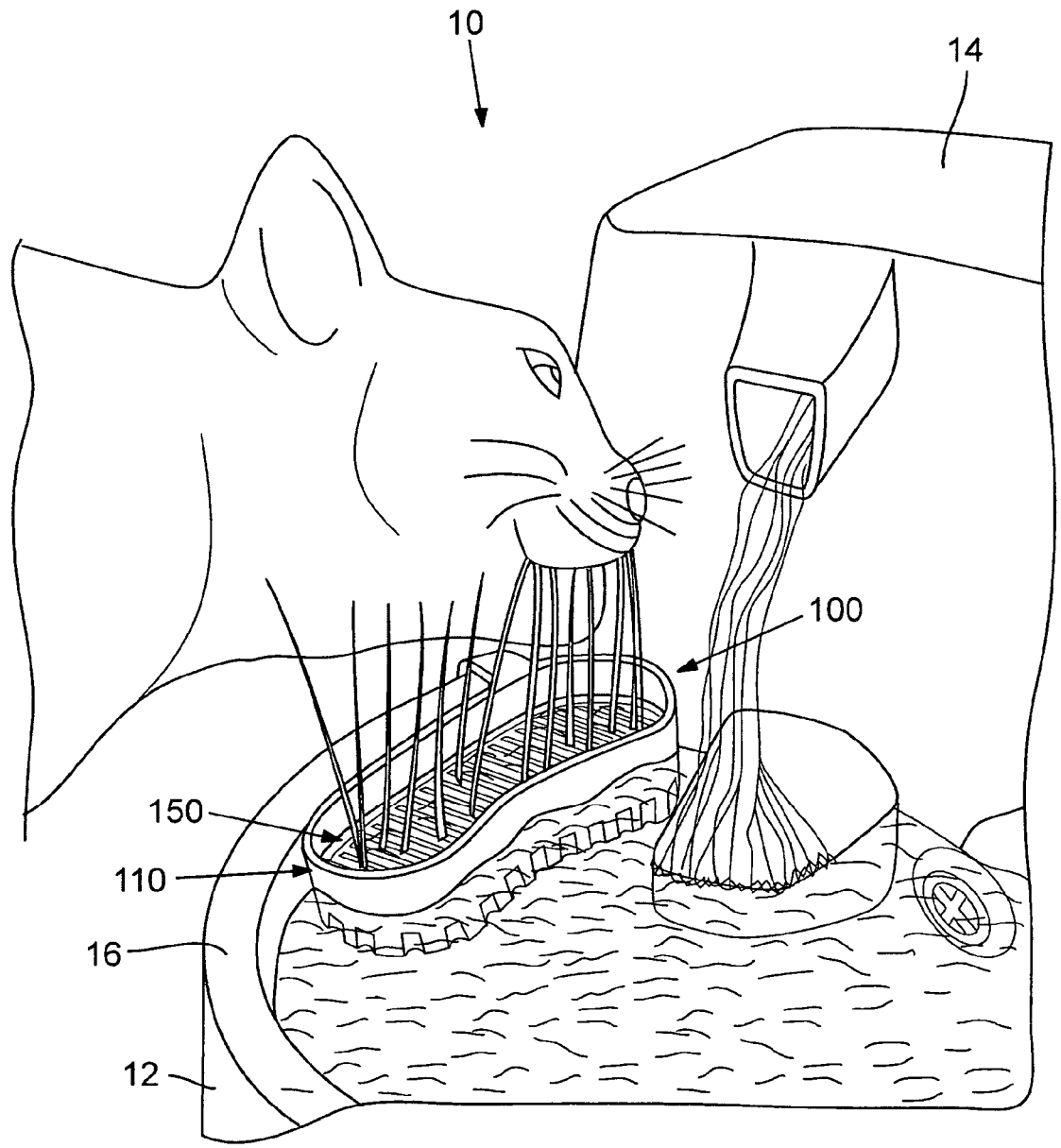
FIG. 17 is a perspective view of a cat enjoying grass grown in the grass-growing device of FIG. 1.

FIG. 1 is a perspective view of a first exemplary embodiment of a grass-growing device 100 that can be used, for instance, to grow grass from seeds when the device 100 is placed within the interior of a water container 10. The container 10 can be any suitable container for holding liquid (for example, water). In some cases, the container 10 is a container that also comprises a circulation mechanism for filtering, aerating, and/or purifying the liquid within the container. For example, the illustrated container 10 is a "pet fountain" comprising a receptacle 12 for providing water to a household pet (such as a dog or cat) and a water circulation mechanism 14. More specifically, the illustrated container 10 is a Drinkwell® pet fountain available from Veterinary Ventures, Inc. For ease of illustration, water is not shown flowing from the spout of the pet fountain in FIG. 1. In operation, however, water flows continuously from the spout (as shown in FIG. 17, for example). The circulation of water in the exemplary container 10 helps the grass seeds germinate and grow with no soil, dirt, or additives. The embodiments of the grass-growing devices described herein are not limited for use with any particular container or pet fountain, however, and can instead be configured for a variety of different containers or fountains.

The grass grown in the device 100 can be of any type generally known to be desired by and beneficial for pets. For instance, in one particular application, the device 100 is used in a pet fountain for cats and contains one or more so-called "kitty grass" seeds. The grass seeds can be for wheatgrass, rye, barley, oat, and/or another type of grass suitable for animal consumption. The leaves or blades grown from such kitty grass seeds can assist (as an emetic) in the elimination of fur balls, help maintain healthy digestive functions, and/or provide beneficial vitamins and trace nutrients to a pet. Moreover, by providing grass in such a device, one can satisfy a pet's natural craving for grass while helping to save houseplants that might otherwise be destroyed. Alternatively, the grass grown in the device 100 serves another purpose (for example, ornamentation).

Figure 2:
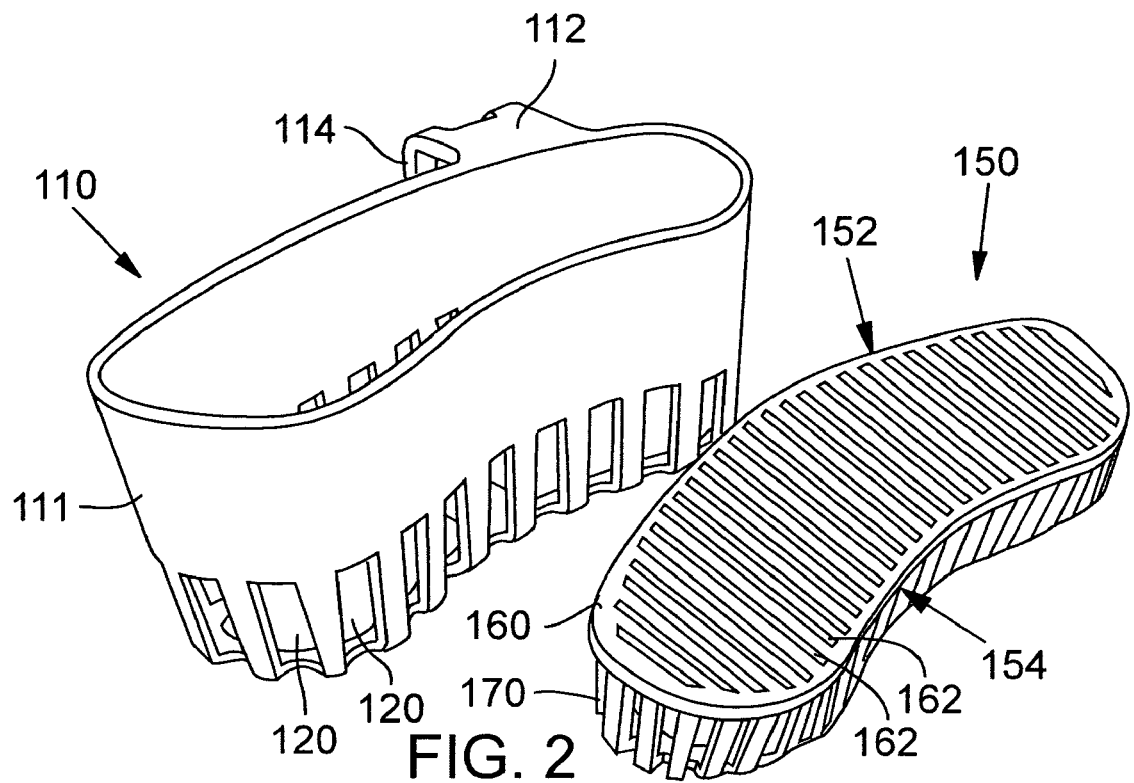
FIG. 2 is a perspective view of the top of a basket and a seed-holding unit of the grass-growing device of FIG. 1.

FIG. 2 is a perspective view of the components of the first exemplary embodiment of the device 100. The exemplary device 100 comprises a basket 110 and a seed-holding unit 150. The seed-holding unit 150 illustrated in FIG. 2 comprises a top portion 160 and a bottom portion 170, which are configured to be substantially complementary to one another and define a seed-holding interior when coupled together. Furthermore, the illustrated seed-holding unit 150 is insertable into the basket 110 and configured to house grass seeds. As more fully described below, both the basket 110 and the seed-holding unit 150 include one or more apertures that allow water to circulate through the device 100, thereby irrigating any seeds located in the seed-holding unit 150.

Figure 3:
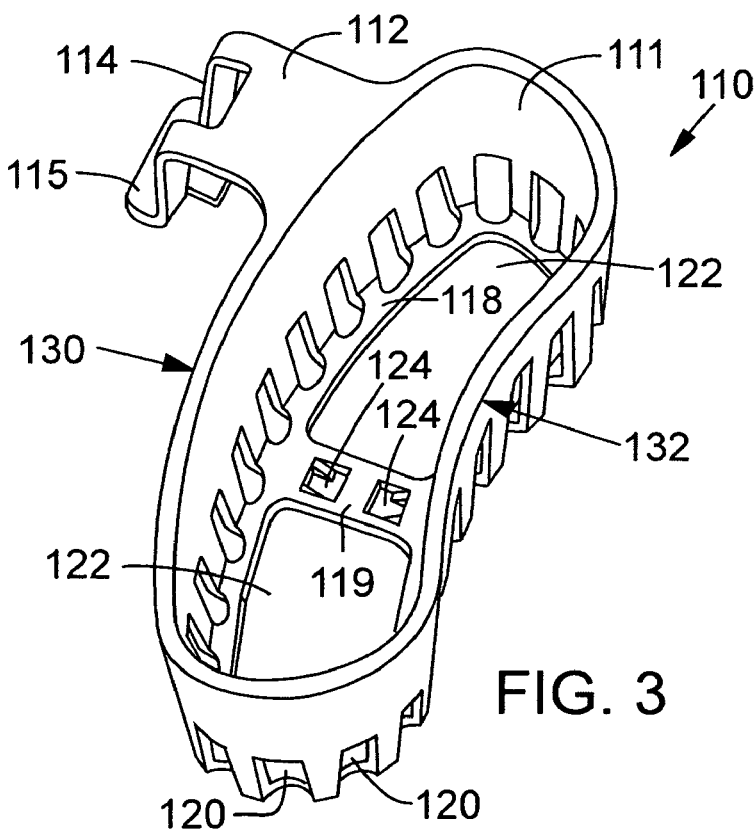
FIG. 3 is a perspective view of the top of a basket of the grass-growing device of FIG. 1.
Figure 4:
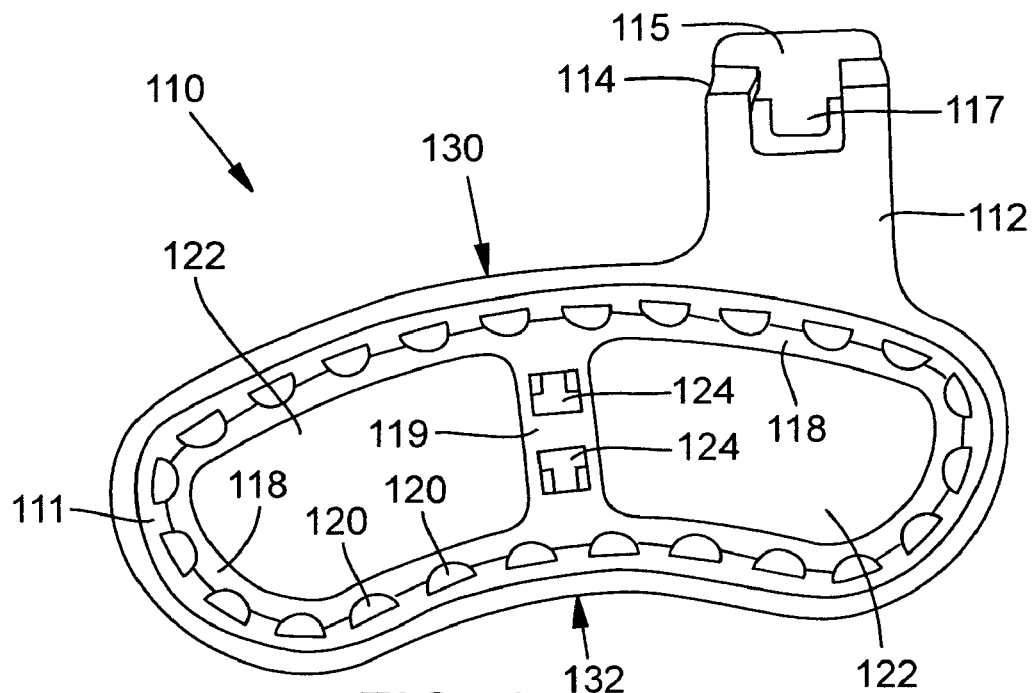
FIG. 4 is a top plan view of the basket of the grass-growing device of FIG. 1.
Figure 5:
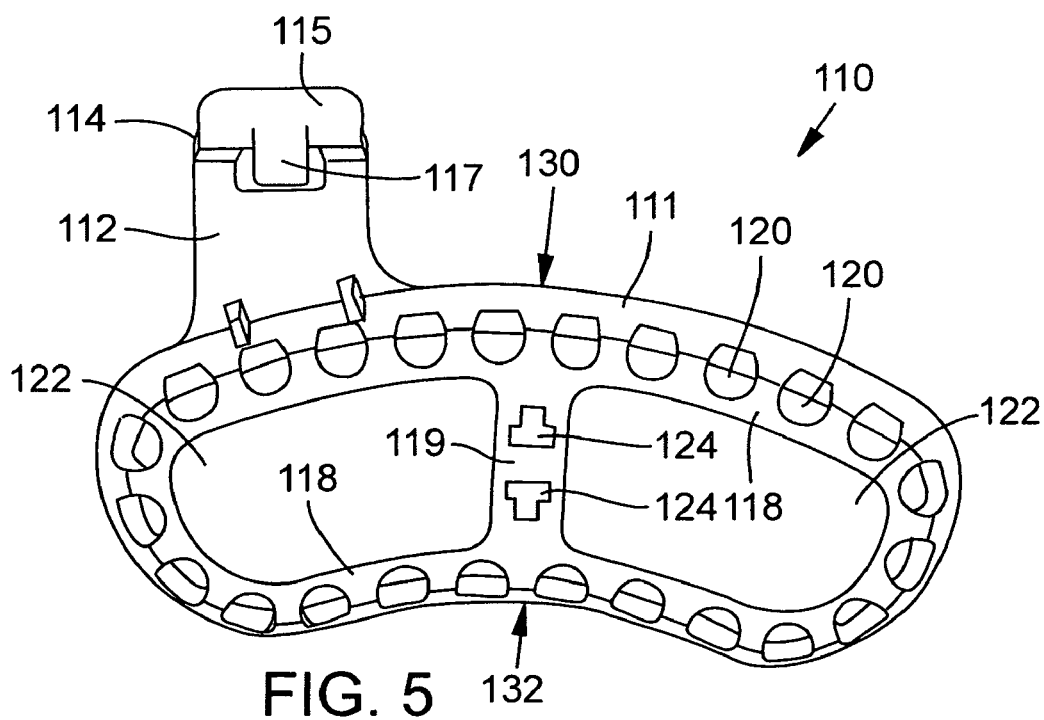
FIG. 5 is a bottom plan view of the basket of the grass-growing device of FIG. 1.
Figure 6:
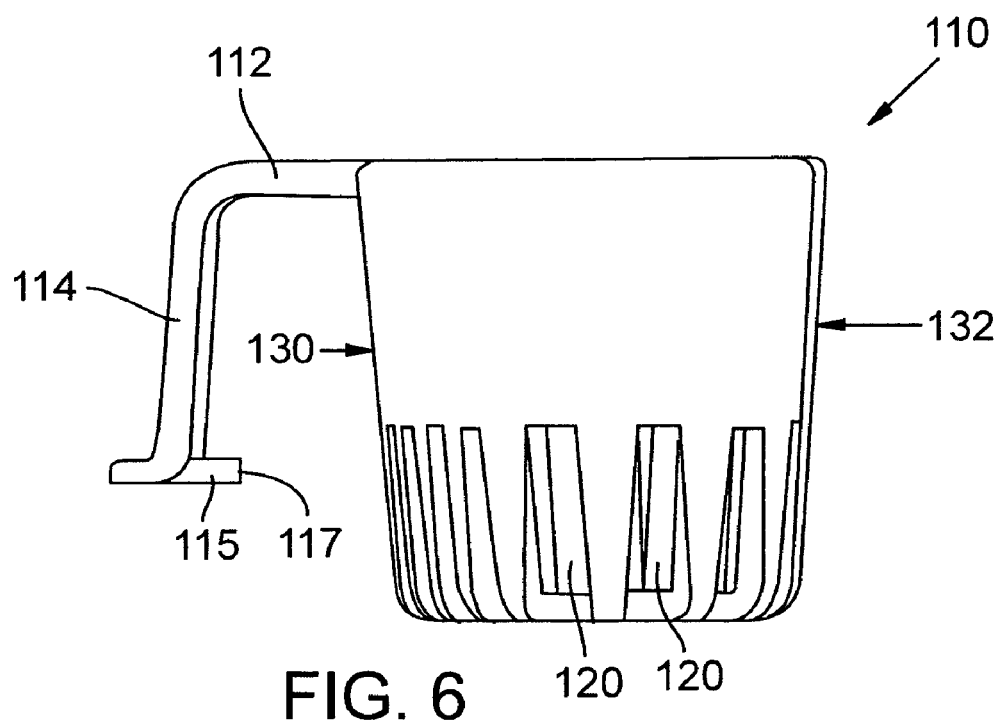
FIG. 6 is an elevation view of the end of the basket of the grass-growing device of FIG. 1.
Figure 7:
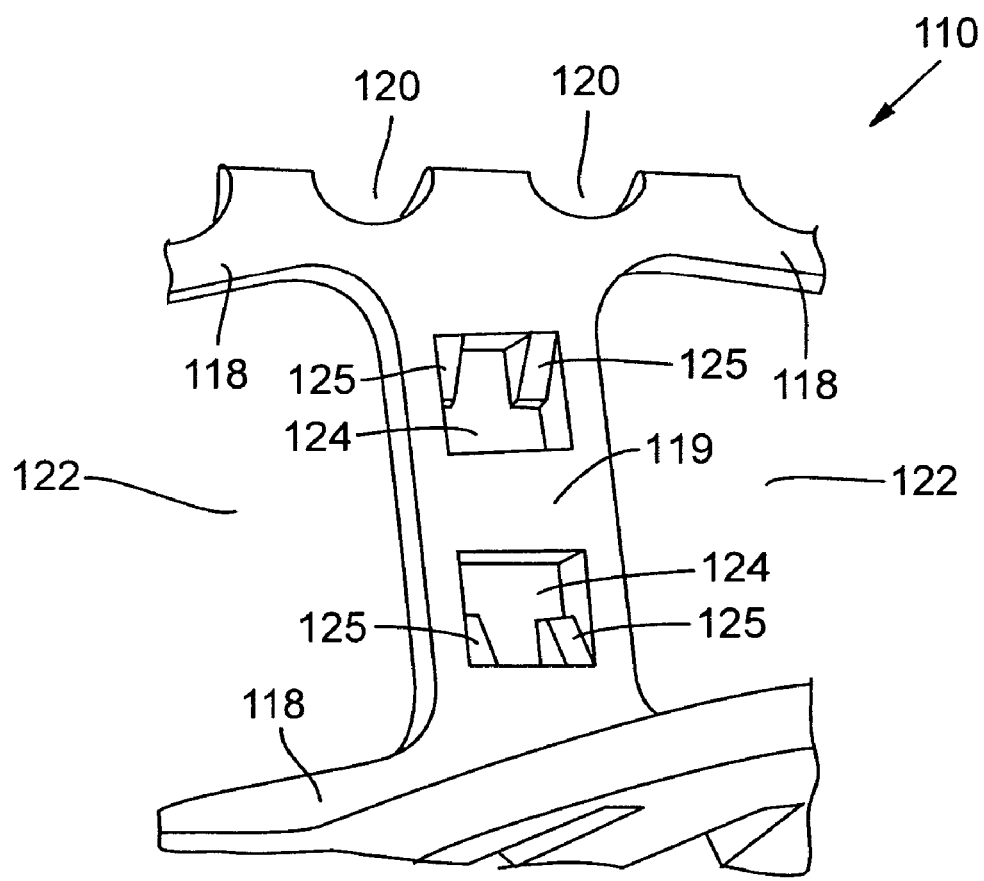
FIG. 7 is a zoomed-in perspective view of fastener-receiving apertures on a support bar of the basket of the grass-growing device of FIG. 1.
Figure 16:
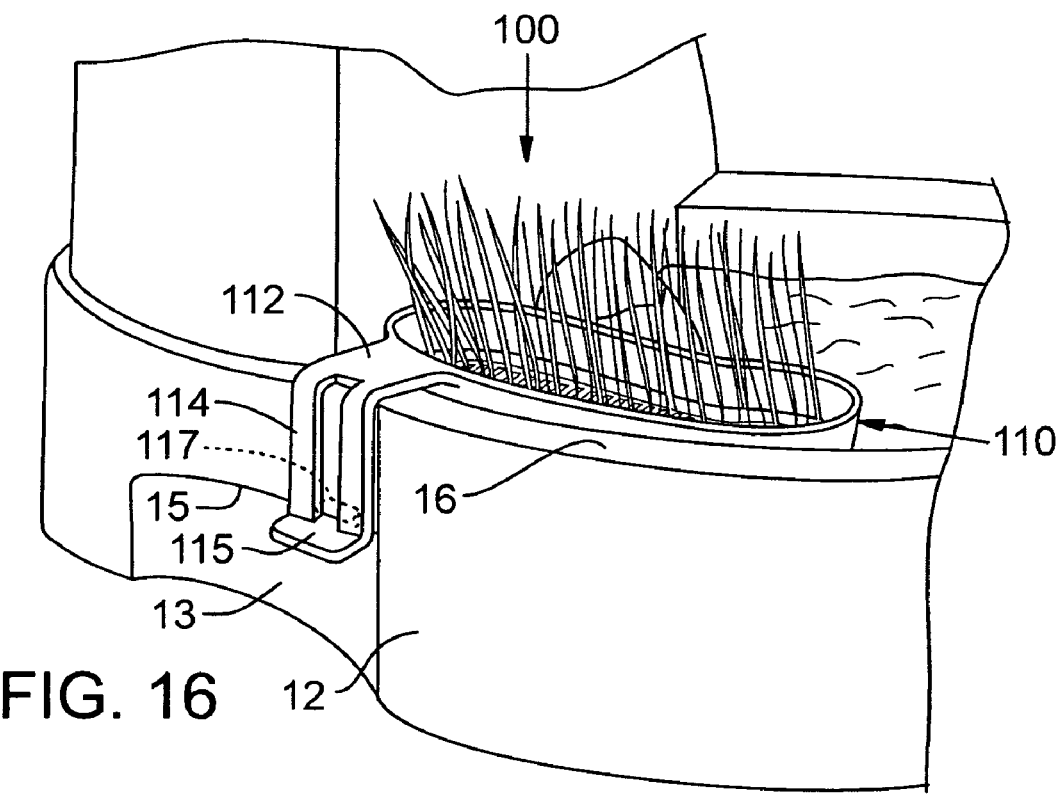
FIG. 16 is another perspective view of the grass-growing device of FIG. 1 attached to a rim of a water container for a household pet.

FIGS. 3-7 show the basket 110 in greater detail. In particular, FIG. 3 is a perspective view of the top of the basket 110, FIG. 4 is a plan view of the top of the basket 110, FIG. 5 is a plan view of the bottom of the basket 110, FIG. 6 is an elevation view of the end of the basket 110, and FIG. 7 is a close-up perspective view of a support bar 119. The basket 110 generally comprises a circumferential side wall 111 having one or more side apertures 120. As best seen in FIGS. 3 and 6, the upper edge of the side wall 111 of the basket 110 includes a projection 112 extending outwardly from the basket 110 and a flange 114 at or near the end of the projection 112. In the illustrated embodiment, the projection 112 and the flange 114 are located adjacent or near an end of the basket 110. The projection 112 and the flange 114 are configured to form a slot that receives the rim of the container on which the device is to be placed. In particular embodiments, the flange 114 is angled inwardly toward the basket 110 and is resiliently flexible so as to help create a tighter, more secure, fit on the lip of the container. In the illustrated embodiment, and as seen in FIG. 6, the flange 114 of the illustrated embodiment further includes a horizontal flange element 115 having a protrusion 117. The protrusion 117 can be used, for example, to help fasten the basket 110 to the rim of the receptacle 12. As best shown in FIG. 16, for instance, the illustrated receptacle 12 includes an indented region 13 that forms a lower lip 15. The indented region 13 can be used, for example, as a handle that allows the receptacle 12 to be more easily lifted and moved. In the illustrated embodiment of the basket 110, the protrusion 117 is configured to extend under and engage the lip 15 of the receptacle 12, thereby better securing the grass-growing apparatus 100 to the rim 16 of the receptacle 12. This attachment mechanism helps prevent the grass-growing apparatus 100 from being lifted from the interior of the receptacle 12 when the grass leaves growing from the apparatus 100 are pulled by a household pet.

In other embodiments, the receptacle 12 does not include an indented region 13 and thus does not have a lower lip 15. In such embodiments, the flange 114 of the basket 110 can be formed so that the flange 114 extends along the width of the receptacle 12. The protrusion 117 can then be formed as a suitably thin element that is configured to extend under the bottom edge of the receptacle. Thus, a similar attachment mechanism to that shown in FIG. 16 can be realized. In still other embodiments, the protrusion 117 can directly contact a side of the receptacle 12 and create a frictional attachment to the receptacle 12. For example, the protrusion 117 or other suitable surface of the flange 114 can contact the exterior surface of the receptacle 12 and flex the flange outward from the receptacle, thereby creating enough force to secure the basket 110 to the rim of the receptacle.

Although one projection and flange are shown in FIGS. 3-6, the basket 110 may comprise multiple additional projections and/or flanges to provide additional support (for example, additional projections and flanges may be utilized for larger baskets). Alternatively, the basket 110 can use other support mechanisms (for example, suction cups at the side or base, a tongue-and-groove mechanism, one or more hooks, weighted legs, or the like) for securing the basket 110 in the interior of the receptacle 12.

The shape of the basket 110 may vary from implementation to implementation. For example, in FIGS. 3-7, the basket 110 has a generally oblong shape with an outward-facing side 130 curved to complement the interior shape of the receptacle in which it is to be placed. As shown in FIGS. 3-5, an inward-facing side 132 is similarly curved to substantially complement the shape of the receptacle. For example, in the illustrated embodiment, the sides 130 and 132 are both configured to have substantially the same radius of curvature as the receptacle 12. The particular shape of the basket 110 shown in FIGS. 3-7, however, should not be construed as limiting, as the basket can have numerous other shapes. In other embodiments, for example, the basket is substantially circular, elliptical, polygonal, or otherwise shaped and dimensioned to fit within a given container and to hold seeds in the fluid of the container. Moreover, the basket 110 does not necessarily have a flat bottom, but may instead have an arcuate bottom, have a bowl-like shape, or have an entirely open bottom if the seed-holding unit attaches to a side of the basket 110 or is otherwise placed within the basket 110.

As seen in FIGS. 3-7, the side wall 111 of the basket 110 includes multiple apertures that allow for fluid movement through the basket 110. For example, the illustrated basket 110 comprises multiple side apertures 120 extending from a bottom edge of the side wall 111 at least partially upward along the elevation of the side wall 111. As seen in FIGS. 2 and 6, the side apertures 120 extend approximately halfway up the side wall 111 of the basket 110. The number, size, and location of the side apertures 120 shown in FIGS. 3-7 is not limiting, however, as other embodiments can comprise different numbers, sizes, or locations of the side apertures, or may exclude the side apertures altogether.

The basket 110 further includes a substantially open bottom that also allows for fluid movement through the basket 110. For example, as best seen in FIGS. 3-5, bottom apertures 122 are formed by a bottom lip 118 of the basket and a support bar 119. In FIGS. 3-5, the bottom lip 118 and the support bar 119 form a supporting surface on which the seed-holding unit 150 rests within the basket 110. The number, size, and location of the bottom apertures 122 shown in FIGS. 3-5, however, should not be construed as limiting, as other embodiments can comprise different numbers, sizes, or locations of the bottom apertures, or may exclude the bottom apertures altogether.

As more fully explained below, the support bar 119 further includes one or more fastener-receiving apertures 124 that are configured to receive corresponding fastener arms 180 located on the bottom surface of the seed-holding unit 150 and frictionally secure the seed-holding unit 150 to the support bar 119 (for example, using a snap-fit mechanism). As best seen in FIG. 7, the fastener-receiving apertures 124 may include one or more sloped elements 125 configured to flex corresponding fastener arms 180 of the seed-holding unit 150 as the seed-holding unit is being inserted into the basket 110. The snap-fit mechanism is described in greater detail below with respect to FIGS. 11-14. The basket 110 (or any basket described herein) can be formed from a wide variety of materials. For example, in certain embodiments, the baskets are formed from suitably rigid materials that are durable, resistant to easy breakage or shattering, and suitably waterproof or nondissolving. For example, the basket 110 can be manufactured from a hard polymer (for instance, plastic, polyethylene, polypropylene, or other such polymers). In such cases, the basket 110 can be manufactured using one or more of a variety of techniques (for example, injection molding). In other embodiments, the basket is formed from a more flexible material, such as cloth, nylon, or other such fabric or fabric-like material. In such embodiments, the material can be meshed or otherwise permeable to liquid so as to allow for fluid movement into the basket. In still other embodiments, other suitable materials are used to manufacture the basket 110 (for example, rubber, metal, and the like).

Referring again to FIG. 2, the grass-growing device 100 further includes a seed-holding unit 150 located within the basket 110. The seed-holding unit 150 generally forms a housing that contains or encloses seeds (for example, kitty grass seeds). The seed-holding unit 150 ordinarily includes one or more apertures through which the leaves or blades from the seeds can grow upward and through which roots from the seeds can grow sideways or downward. The illustrated seed-holding unit 150, for example, includes an array of apertures along its top and side surfaces that are large enough to allow leaf/root growth but small enough to prevent at least some of the seeds from being removed from the seed-holding unit 150 (for example, by a pet tugging at the leaves/blades of grass).

The seed-holding unit 150 illustrated in FIG. 2 is formed of the top portion 160 and the bottom portion 170, which are configured to be substantially complementary to one another and to define a seed-holding interior when coupled together. The size and shape of the seed-holding interior may vary from implementation to implementation. In one particular embodiment, for example, the seed-holding interior has a height great enough to allow seeds within the unit 150 to swell after being inserted into the container 10 and/or to create some space (for example, between three-quarters and one inch) between the seeds and apertures 162 of the top portion 160 to allow the leaves or blades of the seeds to begin growing. Further, as seen in FIG. 2, the exemplary seed-holding unit 150 has a height that approximately corresponds to the height of the side apertures 120 in the basket, though in other implementations, the seed-holding unit 150 can have a different height.

In the illustrated embodiment, the seed-holding unit 150 is shaped to complement the interior of the basket 110 and to fit snugly within the basket. Thus, the seed-holding unit 150 is generally oblong and comprises sides 152, 154 dimensioned to complement the curvature of the sides 130, 132 of the basket 110. Again, the particular shape of the seed-holding unit 150 shown in FIG. 2 should not be construed as limiting, as the seed-holding unit 150 can have numerous other shapes.

In certain implementations, the top and bottom portions 160, 170 of the seed-holding unit 150 are securely attached to one another so that a pet cannot easily open the unit. For example, the top and bottom portions 160, 170 can be attached via a mechanism that allows a user to separate the two portions, or can be more permanently sealed. Whether or not the top and bottom portions 160, 170 are more permanently secured to one another, the seed-holding units 150 can be sold as replaceable seed pods with seeds already located within the units 150. After grass is grown and consumed by a pet, for example, the seed-holding unit 150 can be removed from the basket 110 and replaced with an entirely new unit 150 containing ungrown seeds. In this way, the basket 110 itself may be sold with one or more seed pods, with other seeds pods sold as replacement packs. The replacement seeds or seed pods can be the same or different varieties of grass seed. Or, the basket may be sold with a single seed-holding unit 150, with seeds added or replaced in the unit 150 from time to time.

Like the basket 110, the top and bottom portions 160, 170 of the seed-holding unit 150 can be formed from a wide variety of suitably rigid materials that are durable, resistant to easy breakage or shattering, and suitably waterproof or non-dissolving. For example, the portions 160, 170 can be manufactured from a hard polymer (for instance, plastic, polyethylene, polypropylene, or other such polymers). In such cases, the unit portions 160, 170 can be manufactured using one or more of a variety of techniques (for example, injection molding). In other embodiments, the seed-holding unit 150 can be formed at least in part from a more flexible material, such as cloth, nylon, or other such fabric or fabric-like material. The material can be permeable to liquid so as to allow for fluid movement into the seed-holding unit 150. For example, one or more walls of the seed-holding unit 150 can be formed from such a flexible material. In one specific implementation, the bottom portion of the seed-holding unit 150 is formed from such a flexible material and comprises a bag-like structure into which the seeds can be placed. In still other embodiments, other suitable materials are used to manufacture the seed-holding unit 150 or portion 160, 170 thereof (for example, rubber, metal, and the like).

Figure 8:
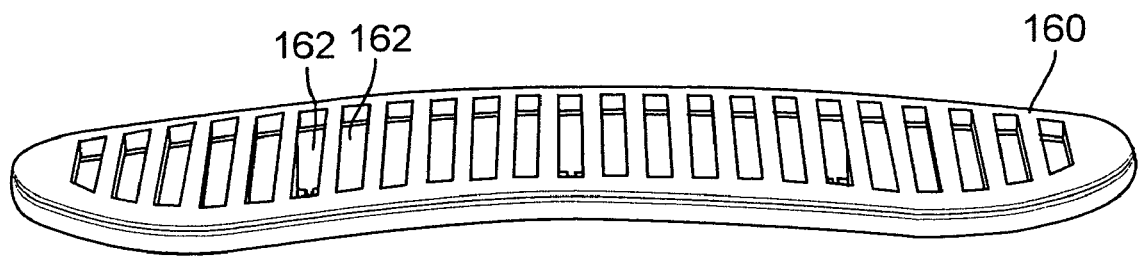
FIG. 8 is perspective view of the top of a top portion of the seed-holding unit of the grass-growing device of FIG. 1.
Figure 9:
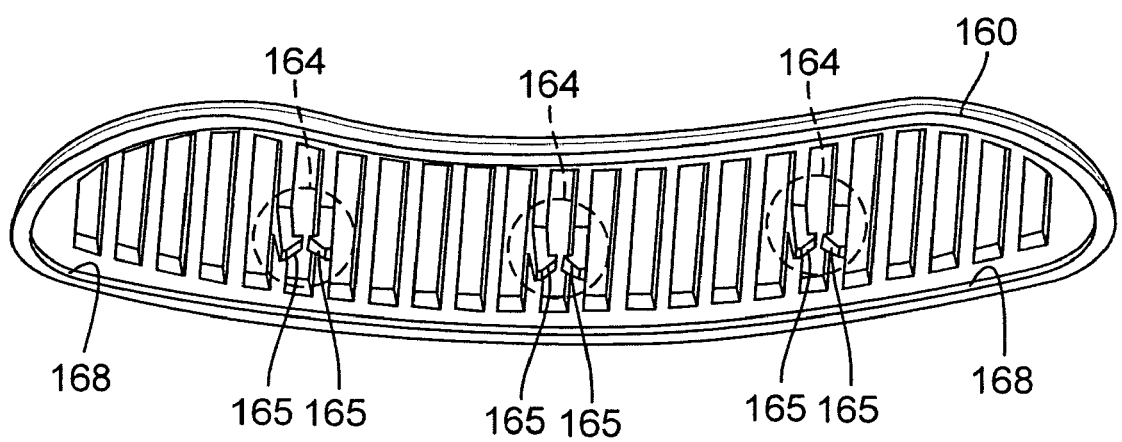
FIG. 9 is a perspective view of the bottom of the top portion of the seed-holding unit of the grass-growing device of FIG. 1.
Figure 10:
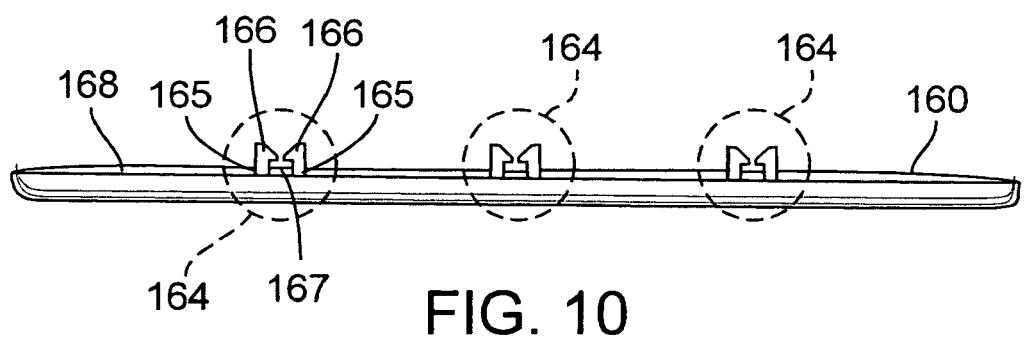
FIG. 10 is an elevation view of the top portion of the seed-holding unit of the grass-growing device of FIG. 1.

FIGS. 8-10 show the top portion 160 of the exemplary seed-holding unit 150 in greater detail. In particular, FIG. 8 is a perspective view of the top of the top portion 160, FIG. 9 is a perspective view of the bottom of the top portion 160, and FIG. 10 is a side view of the top portion 160. As best seen in FIGS. 8 and 9, the upward-facing surface of the top portion 160 includes multiple apertures 162. The apertures 162 are dimensioned to allow growth (for examples, leaves or blades) from seeds contained within the unit 150 to extend outwardly and upwardly from the seed-holding unit 150. In particular implementations, the size of the apertures 162 is selected to allow leaves or blades from the enclosed seeds of one or more varieties of grass to extend out of the seed-holding unit 150 while preventing the seeds (or at least a majority of the seeds) from being easily pulled through the apertures 162. For example, the apertures 162 can have a width slightly smaller than the diameter of a typical seed of a particular grass variety expected to be used in the device 100. In this way, when a pet pulls at a seed when eating the leaf or blade from the seed, the seed will remain secured within the seed-holding unit 150. (Otherwise, the blade of grass and the seed could be pulled from the seed-holding unit 150 and the basket 110, and end up on the floor or floating in the container 10.) The top portion 160 therefore forms a seed-securing element or barrier with a perforated wall for promoting grass growth. In one particular implementation, for instance, the apertures 162 are dimensioned to form openings that are smaller than the diameter of at least a majority of the seeds expected to be used in the seed-holding unit 150.

Figure 15:
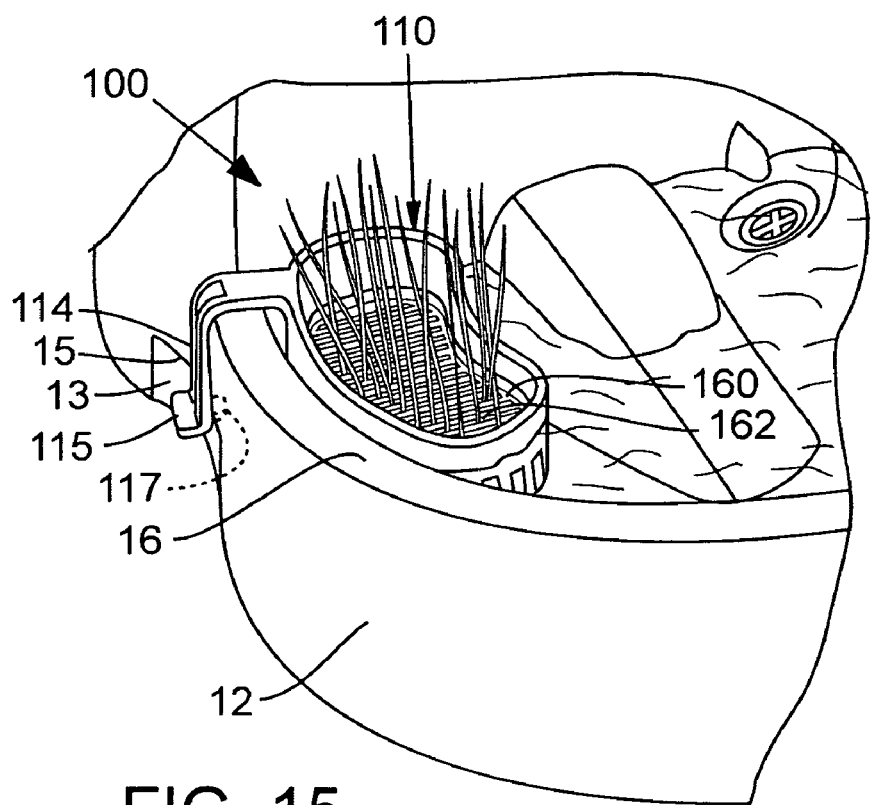
FIG. 15 is a perspective view of the grass-growing device of FIG. 1 attached to a rim of a water container for a household pet.

FIG. 15 shows the first exemplary embodiment of the device 100 attached to the rim 16 of a receptacle 12 and shows multiple leaves of grass extending outward from apertures 162 on the top portion 160 of the seed-holding unit 150. As can be seen in FIG. 15, the apertures 162 (here, elongated slits) are configured to be large enough to allow the leaves to grow through, but not large enough to allow passage of the seeds themselves.

In the first exemplary embodiment of the grass-growing device 100 shown in FIGS. 8-10, the apertures 162 are arranged as regularly spaced slits that promote substantially ordered and evenly distributed seed growth within the seed-holding unit 150. The particular arrangement illustrated in FIGS. 8-10, however, should not be construed as limiting, as a wide variety of other sizes, shapes, distributions and/or aperture arrangements are possible (linear, rectilinear, random, circular, or other such arrangements).

FIGS. 9 and 10 also show that the bottom surface of the top portion 160 further comprises multiple pairs 164 of fastener arms 165 that form part of a snap-fit mechanism for securing the top portion 160 to the bottom portion 170. In particular, three pairs 164 of fastener arms 165 are shown—one pair located centrally on the bottom surface of the top portion 160 and two pairs located toward respective outward ends of the top portion 160. The fastener arms 165 of each pair 164 comprise tapered head portions 166 that oppose each other and have protruding lips that together define a catch region 167 (for clarity purposes, only one pair of tapered head portions and one catch region are referenced in FIG. 10). In use, the pairs 164 of fastener arms 165 frictionally interface with corresponding mating elements 178 of the bottom portion 170 (shown in FIGS. 11-14) and secure the top portion 160 to the bottom portion 170. For example, the top portion 160 can be secured to the bottom portion 170 by aligning the pairs 164 of fastener arms 165 with the corresponding mating elements 178 of the bottom portion 170 and pressing the two portions 160, 170 together. This action urges the respective fastener arms 165 of the pairs 164 apart from one another until the tapered head portions 166 are pushed past the end of the corresponding mating elements 178. The fastener arms 165 then return to their original positions and secure the mating elements 178 in the respective catch regions 167 of the pairs 164.

It should be noted that in certain embodiments the fastener arms 165 are constructed to be flexible enough to allow the top portion 160 to be separated from the bottom portion 170 using a force greater than that used to secure the portions 160, 170 together, but not great enough to break the fastener arms 165. In other embodiments, however, the fastener arms 165 are constructed so that they are flexible enough to allow for engagement of the top portion 160 to the bottom portion 170, but rigid enough to break or shatter when one tries to separate the portions 160, 170. In such embodiments, the top portion 160 and the bottom portion 170 can be coupled to one another once by the manufacturer after seeds are loaded. Subsequently, if a user tries to separate the two portions 160, 170, the seed-holding unit 150 will break. Such embodiments discourage users from replacing the seeds in the seed-holding units 150. Also seen in FIGS. 9 and 10 is a top-portion edge 168 that extends circumferentially around the perimeter of the top portion 160 and that is configured to interface with the outer upper surface of the bottom portion 170.

Although the top portion 160 and the bottom portion 170 of the first exemplary embodiment are secured to one another via a snap-fit mechanism formed from the pairs 164 of fastener arms 165, the portions 160, 170 can be affixed to one another through a wide variety of fastening means. For example, the portions 160, 170 can be fastened together adhesively, with threaded or non-threaded fasteners, with posts frictionally engaged to corresponding annular elements, hinges, hooks, tongue-and-groove mechanisms, or the like. In still other embodiments, the portions are not affixed to one another at all.

Instead of having top and bottom portions 160, 170, the unit 150 can be formed from complementary left and right sides affixed to one another through a hinge, snap-fit mechanism or other attachment mechanism. Or, the unit is formed of some other combination of complementary portions. Or, the unit is formed from a single enclosure portion having a door affixed with a hinge or other mechanism.

Figure 11:
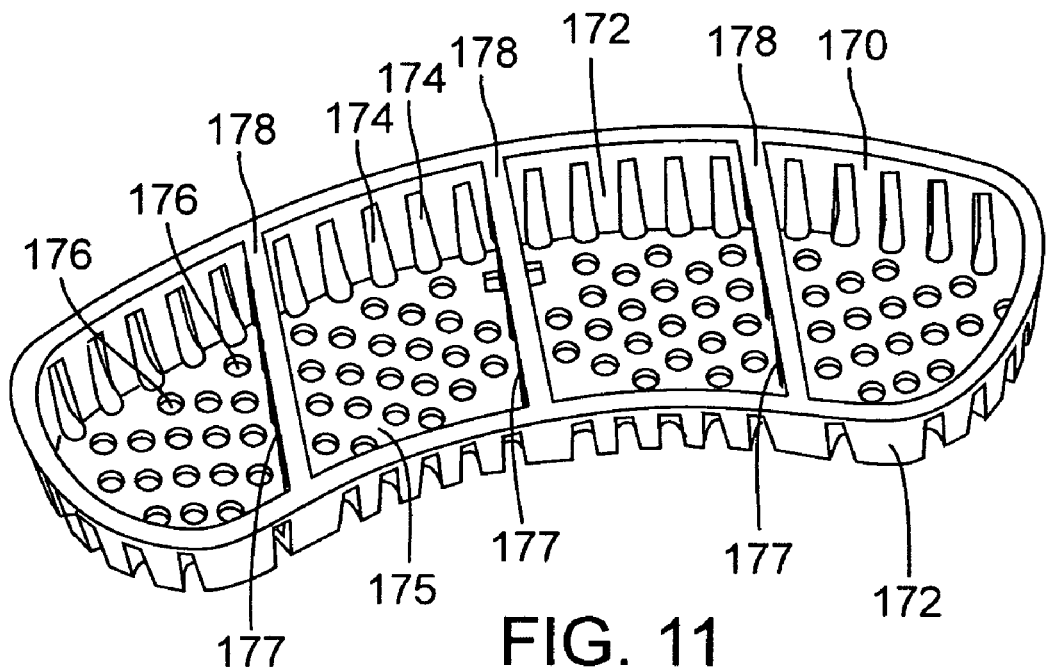
FIG. 11 is a perspective view of the top of a bottom portion of the seed-holding unit of the grass-growing device of FIG. 1.
Figure 12:
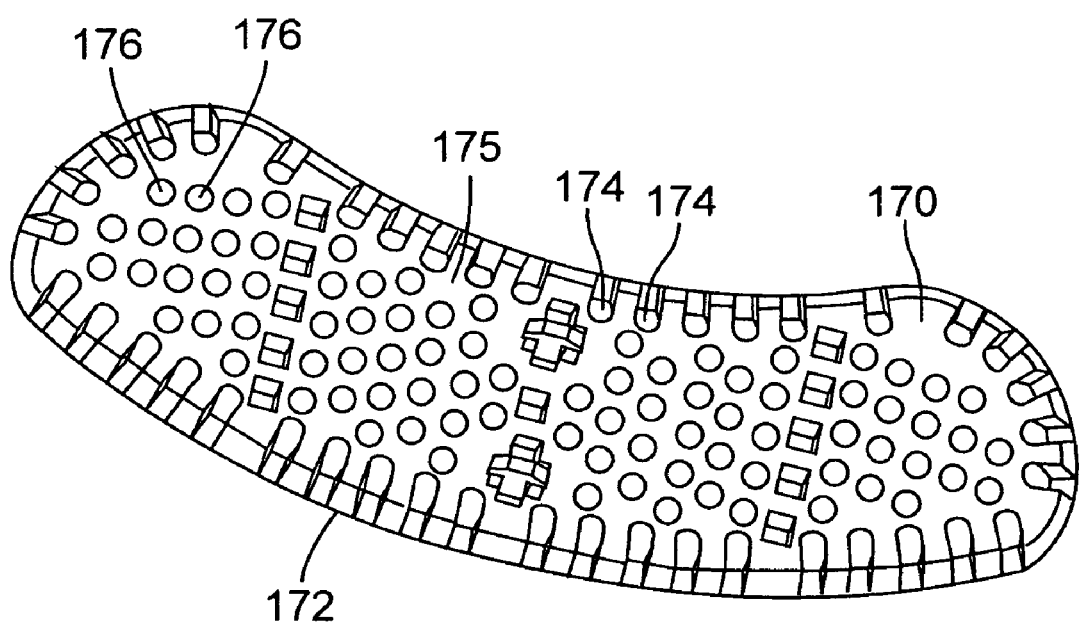
FIG. 12 is a plan view of the bottom of a bottom portion of the seed-holding unit of the grass-growing device of FIG. 1.
Figure 13:
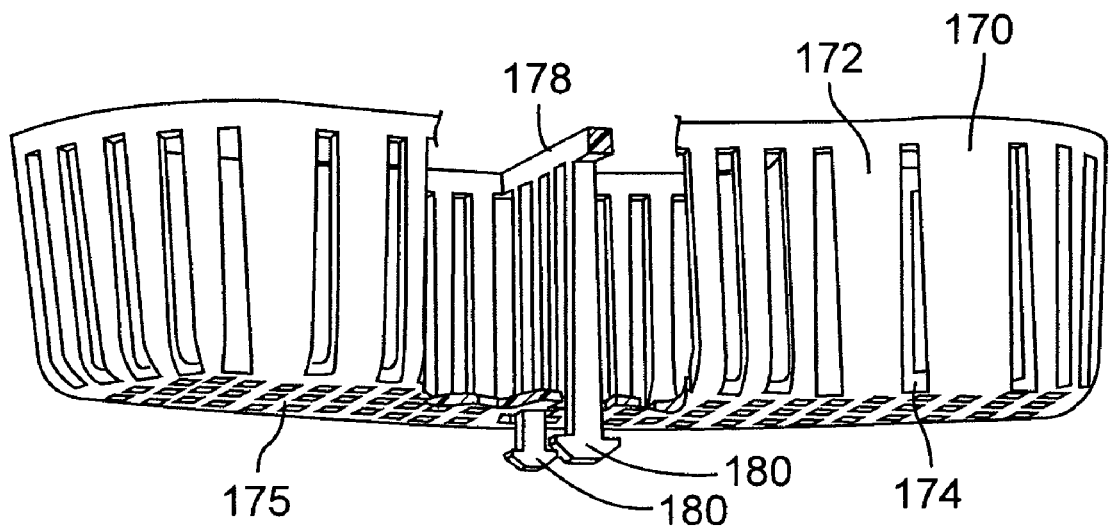
FIG. 13 is a cut-away perspective view of the side of the bottom portion of the seed-holding unit of the grass-growing device of FIG. 1.
Figure 14:
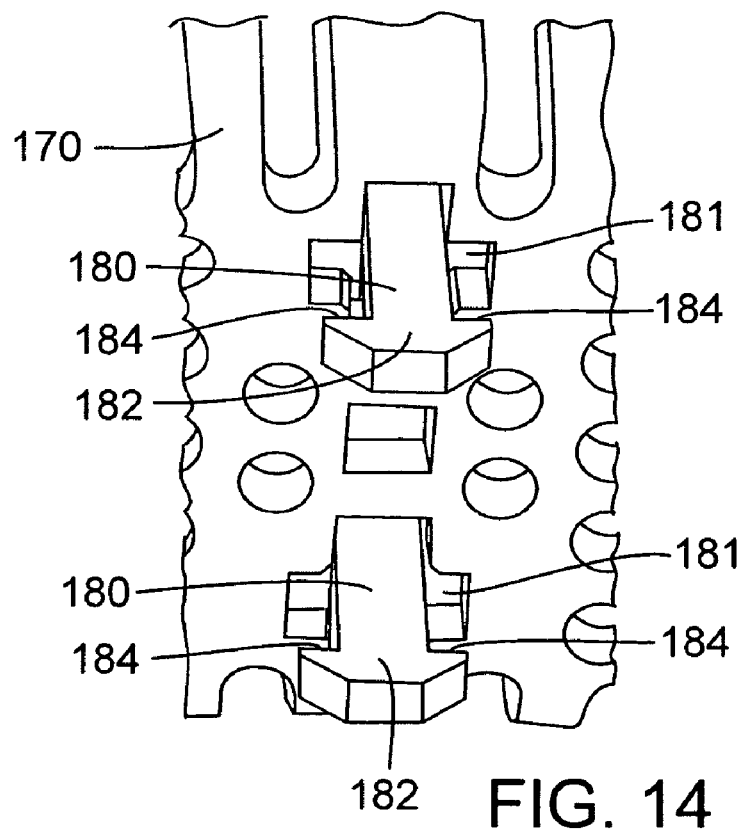
FIG. 14 is zoomed-in perspective view of fastener arms on the bottom surface of the bottom portion of the seed-holding unit of the grass-growing device of FIG. 1.

FIGS. 11-14 show the bottom portion 170 of the seed-holding unit 150 in greater detail. In particular, FIG. 11 shows a perspective view of the top of the bottom portion 170, FIG. 12 shows a plan view of the bottom of the bottom portion 170, FIG. 13 shows a cut-away perspective view of the side of the bottom portion 170, and FIG. 14 shows a zoomed-in perspective view of the bottom of the bottom portion 170. The bottom portion 170 is shaped to complement the top portion 160. In the exemplary embodiment, the bottom portion 170 is a container comprising a side wall 172 and a bottom 175. As best seen in FIGS. 11 and 13, the bottom 175 includes multiple apertures 176 that allow fluid to circulate through the seed-holding unit 150, thereby helping the seeds within the seed-holding unit 150 to better absorb the nutrients in the fluid. The apertures 176 also allow for growth of roots downward and outward from the seeds in the seed-holding unit 150, but help prevent at least some of the seeds from falling out of the seed-holding unit. In this manner, the seeds within the seed-holding unit 150 can be hydroponically grown within the grass-growing device 100. In the illustrated embodiment, the apertures 176 are circular and are distributed relatively uniformly across the bottom 175. The number, sizes, and locations of the apertures 176 shown in FIGS. 11-14 should not be construed as limiting, however, as the apertures 176 can be arranged differently or may be excluded altogether from the bottom portion 170.

The interior of the bottom portion 170 further comprises one or more dividing walls 177 that separate the interior of the bottom portion 170 into multiple compartments. The dividing walls 177 can further comprise one or more apertures that allow fluid to flow between the compartments. For example, in the illustrated embodiment, the apertures in the dividing walls 177 are vertical slits formed by vertical posts that extend along the length of the dividing walls. As mentioned above, the tops of the dividing walls 177 form mating element (or beams) 178 that are configured to securely fit into the respective catch regions 167 of the fastener-arm pairs 164 of the top portion 160 and secure the bottom portion 170 thereto.

In the illustrated embodiment, and as best shown in FIGS. 13 and 14, the exterior surface of the bottom 175 of the bottom portion 170 includes outwardly extending fastener arms 180. In the particular implementation illustrated in FIG. 14, and as best shown in the cut-away view of FIG. 13, the fasteners arms 180 are formed from respective posts in one of the dividing walls 177 and extend through fastener-arm apertures 181 of the bottom 175 of the bottom portion 170. In general, the fastener arms 180 of this embodiment are flexible arms that form part of a snap-fit mechanism that removably secures the seed-holding unit 150 to the basket 110. In particular, and as best shown in FIG. 14, the fastener arms 180 comprise respective tapered head portions 182, which each have two tapered surfaces and define two protruding lips 184. When the seed-holding unit 150 is pressed into the interior of the basket 110, the fastener arms 180 are urged inward toward each other by the sloped elements 125 of the fastener-receiving apertures 124 of the basket 110. The fastener arms 180 continue to flex toward one another until the respective head portions 182 of the fastener arms 180 extend beyond the sloped elements 125. The fastener arms 180 then return to their original positions, and the protruding lips 184 become frictionally engaged against the bottoms of the sloped elements 125, thereby securing the seed-holding unit 150 to the support bar 119 of the basket 110. To remove the seed-holding unit 150 from the basket 110, a user can squeeze the fastener arms 180 together, thereby releasing the protruding lips 184 from contact with the bottoms of the sloped elements 125 and allowing the seed-holding unit 150 to be separated from the basket 110. Alternatively, the seed-holding unit attaches to the bottom and/or sides of the basket 110 using another mechanism or floats free in the basket 110. In still other embodiments, the seed-holding unit is formed integrally within the basket 110 such that it cannot be removed therefrom. Further, in some embodiments, the container itself is formed to include a seed-holding unit into which one or more grass seeds can be placed.

FIG. 17 is an image of grass grown in the first exemplary embodiment of the grass-growing device 100 being enjoyed by a household pet (here, a cat). As explained above, the seed-holding unit 150 of the illustrated embodiment can be secured to the interior of the basket 110, and the top portion 160 of the seed-holding unit 150 can help prevent the seeds from being removed from the basket 110 when the grass leaves are eaten. Moreover, the top portion 160 can help the pet more easily tear or separate the leaves from the seeds. As noted above, as an emetic, the grass leaves grown from the seeds can help eliminate fur balls. The grass can also promote healthy digestive functions and provide beneficial vitamins and trace nutrients to household pets.

Figure 18:
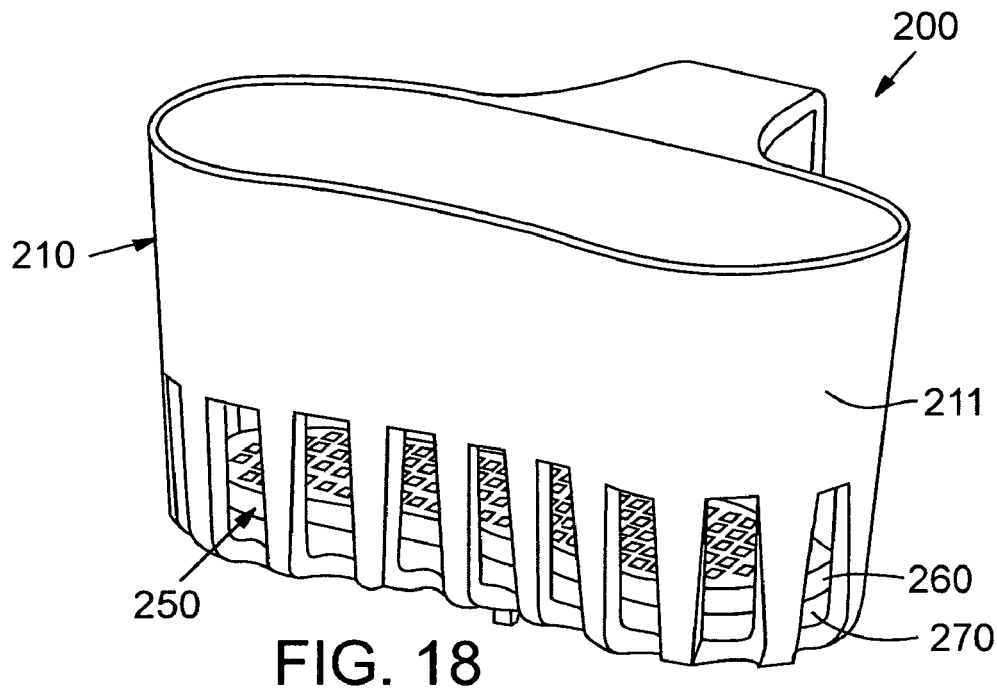
FIG. 18 is a perspective view of a second exemplary embodiment of a grass-growing device.
Figure 19:
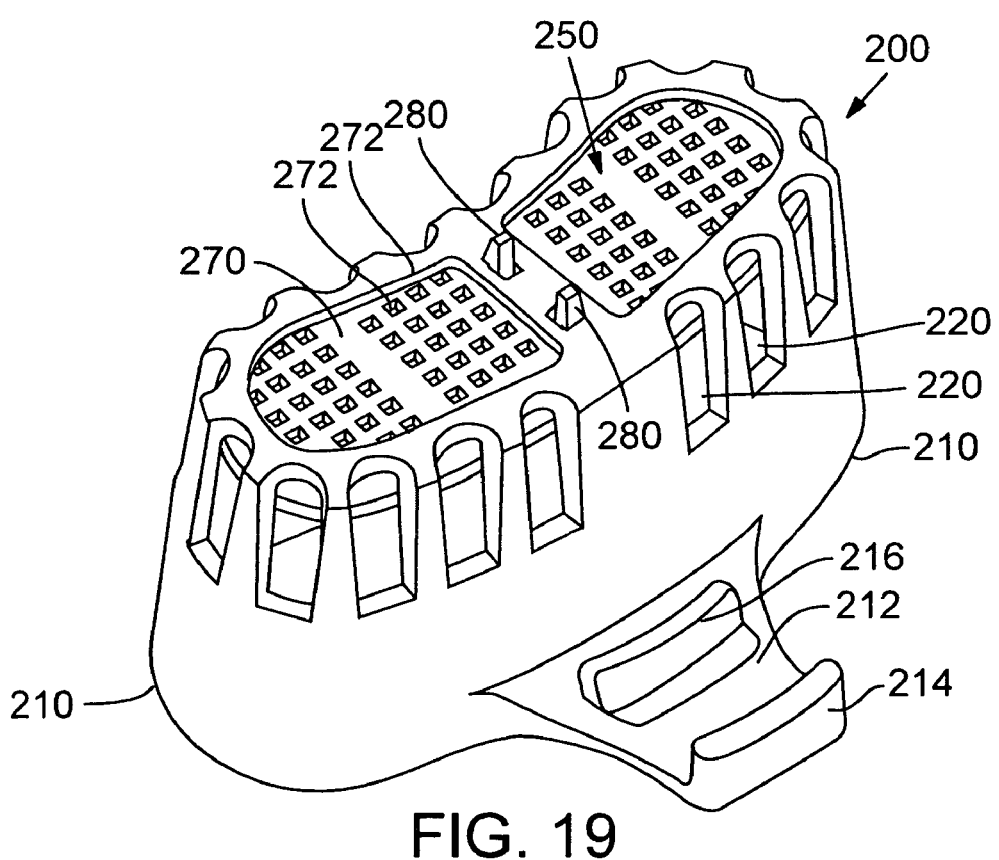
FIG. 19 is a perspective view of the bottom of the grass-growing device of FIG. 18.
Figure 20:
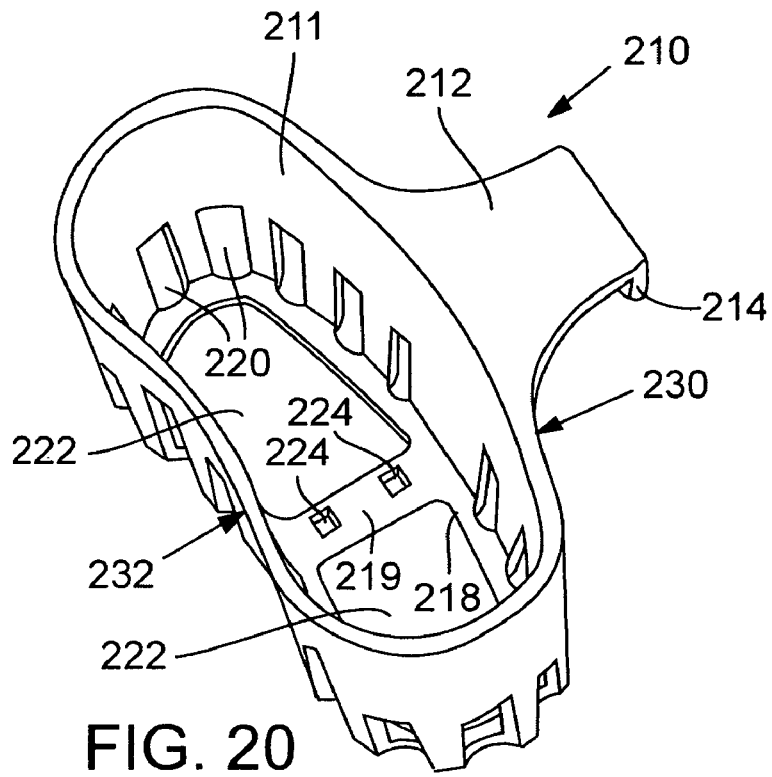
FIG. 20 is a perspective view of the top of a basket of the grass-growing device of FIG. 18.
Figure 21:
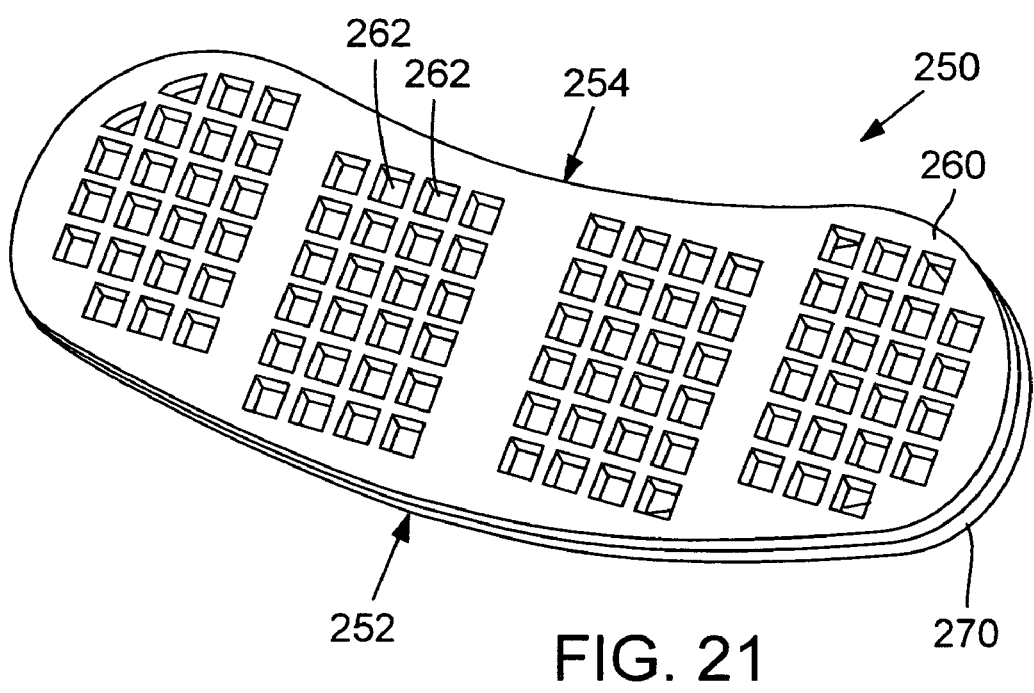
FIG. 21 is a perspective view of the top of a seed-holding unit of the grass-growing device of FIG. 18.

FIGS. 18-25 show a second exemplary embodiment of a grass-growing device 200. In particular, FIG. 18 is a perspective view of the top of the second exemplary grass-growing device 200, FIG. 19 is a perspective view of the bottom of the grass-growing device 200, FIG. 20 is a perspective view of the top of a basket 210 of the grass-growing device 200, and FIG. 21 is a perspective view of the top of a seed-holding unit 250 of the grass-growing device 200.

The second exemplary device 200 comprises a basket 210 and a seed-holding unit 250. The seed-holding unit 250 illustrated in FIGS. 18 and 19 comprises a top portion 260 and a bottom portion 270 that are configured to be substantially complementary to one another and to define a seed-holding interior when coupled together. Furthermore, the seed-holding unit 250 is insertable into the basket 210 and configured to house grass seeds.

In this embodiment, the upper edge of the basket 210 includes a projection 212 extending transversely from the basket 210 and a flange 214 at or near the end of the projection 212. The projection 212 extends from a substantially central location along the upper edge of the basket 210. The projection 212 and the flange 214 are configured to form a slot that receives the rim of a container (such as the container 10) and frictionally secures the basket 210 in the interior of the container. In this manner, the basket 210 can be suspended in the interior of the container by the projection 212 and the flange 214. In certain embodiments, the flange 214 is angled inwardly toward the basket and resiliently flexible so as to create a tighter, more secure, fit on the lip of the container. As best seen in FIG. 19, the bottom of the projection 212 from the basket 210 further includes an interior flange 216 configured to frictionally engage the lip of the container and help support and suspend the basket 210 within the interior of the container. The interior flange 216 can be formed integrally with the basket 210, or can be a separate and optionally adjustable component. Alternatively, the bottom of the projection 212 includes no additional interior flange.

Although one projection 212 is shown in FIGS. 18-20, the basket 210 may comprise multiple additional projections and/or flanges to provide additional support (for example, additional projections and flanges may be utilized for larger baskets 210). Alternatively, the basket 200 uses other support mechanisms (for example, suction cups at the side or base, a tongue-and-groove mechanism, one or more hooks, weighted legs or a weighted portion, or the like) for support.

The shape of the basket 210 may vary from implementation to implementation. For example, as best shown in FIG. 20, the basket 210 has a generally oblong shape with an outward-facing side 230 curved to complement the interior shape of a circular container (such as the container 10). An interior side 232 is curved to substantially complement the shape of the container. For example, the sides 230 and 232 are both configured to have substantially the same radius of curvature as the container 10. The particular shape of the basket 210 shown in FIGS. 18-20, however, should not be construed as limiting, as the basket can have numerous other shapes. In other embodiments, for example, the basket is substantially circular, elliptical, polygonal, or otherwise shaped and dimensioned to fit within a given container and to hold seeds in the fluid of the container.

As seen in FIGS. 18-20, the basket 210 includes multiple apertures that allow for fluid movement through the basket. For example, the illustrated basket 210 comprises multiple side apertures 220 extending from a bottom edge of a side wall 211 of the basket 210 partially upward along the elevation of the side wall 211. The number, size, and location of the side apertures 220 shown in FIGS. 18-20 is not limiting, however, as other embodiments can comprise different numbers, sizes, or locations of the side apertures, or may exclude the side apertures altogether. Also seen in FIGS. 18 and 19 is the height of the side apertures 220 relative to the seed-holding unit 250. In this embodiment, the side apertures 220 extend approximately halfway up the side wall 211 of the basket 210 so that a portion of the leaves or blades growing from the seeds in the seed-holding unit 250 are directly exposed to the circulating water of the container in which the basket 210 is placed.

The basket 210 further includes a substantially open bottom that also allows for fluid movement through the basket 210. For example, in FIG. 20, bottom apertures 222 are formed by a bottom lip 218 of the basket 210 and a support bar 219. The bottom lip 218 and the support bar 219 form a supporting surface on which the seed-holding unit 250 rests within the basket 210. The number, size, and location of the bottom apertures 222 shown in FIG. 20, however, should not be construed as limiting, as other embodiments can comprise different numbers, sizes, or locations of the bottom apertures, or may exclude the bottom apertures altogether. As more fully explained below, the support bar 219 further includes one or more fastener-receiving apertures 224 that are configured to receive corresponding fastener arms located on the bottom surface of the seed-holding unit 250 and to frictionally secure the seed-holding unit 250 to the support bar 219 (for example, using a snap-fit mechanism).

The device 200 further includes a seed-holding unit 250 located within the basket 210. As best shown in FIG. 21, the seed-holding unit 250 generally forms a housing that contains or encloses seeds (for example, kitty grass seeds) within the basket 210 and that includes one or more apertures through which the leaves or blades from the seeds can grow upward and through which roots from the seeds can grow sideways or downward. For example, in the embodiment illustrated in FIG. 21, the seed-holding unit 250 comprises an integral housing that holds the seeds securely within the basket. In some cases, the seed-holding unit 250 can be removed from the basket and, in certain implementations, opened in order to replace the seeds located therein. The illustrated seed-holding unit 250 includes an array of apertures that are large enough to allow leaf/root growth but small enough to prevent at least some of the seeds from being removed from the seed-holding unit 250 (for example, by a pet tugging at the leaves/blades of grass).

FIG. 21 shows the exemplary seed-holding unit 250 of the second exemplary embodiment in greater detail. In this embodiment, the seed-holding unit 250 is formed of a top portion 260 and a bottom portion 270 configured to be substantially complementary to one another and to define a seed-holding interior when coupled together. The size and shape of the seed-holding interior may vary from implementation to implementation. In one particular embodiment, for example, the seed-holding interior has a height great enough to allow seeds within the unit 250 to swell after being inserted into the container 10 and/or to create some space (for example, approximately a quarter of an inch) between the seeds and the apertures 262 to allow the leaves or blades of the seeds to begin growing. In the second exemplary embodiment, the height of the seed-holding interior in the seed-holding unit 250 is less than that in the seed-holding unit 150 of the first exemplary embodiment described above. Further, as seen in FIGS. 18 and 19, the seed-holding unit 250 of the second exemplary embodiment is shaped to complement the interior of the basket 210 and to fit snugly within the basket 210. Thus, the seed-holding unit 250 is generally oblong and comprises sides 252, 254 dimensioned to complement the curvature of the sides 230, 232 of the basket 210. Again, the particular shape of the seed-holding unit 250 shown in FIGS. 18, 19, and 21 should not be construed as limiting, as the seed-holding unit 250 can have numerous other shapes.

As seen in FIG. 21, the upward-facing surface of the top portion 260 includes multiple apertures 262. The apertures 262 are dimensioned to allow growth (for examples, leaves or blades) from seeds contained within the unit 250 to extend outwardly and upwardly from the unit 250. In particular implementations, the size of the apertures 262 is selected to allow leaves or blades from the enclosed seeds of one or more varieties of grass to extend out of the seed-holding unit 250 while preventing the seeds (or at least a majority of the seeds) from being easily pulled through the apertures 262. For example, the apertures 262 have a dimension slightly smaller than the diameter of a typical seed of a particular grass variety expected to be used in the seed-holding unit 250. In this way, when a pet pulls at a seed when eating the leaf or blade from the seed, the seed will remain secured within the seed-holding unit 250. (Otherwise, the blade of grass and the seed could be pulled from the basket 210 and end up on the floor or counter, or floating in the container in which the device 200 is placed.) In the second exemplary embodiment, the apertures 262 are arranged in substantially rectilinear arrays that promote substantially ordered and evenly distributed seed growth within the seed-holding unit. For example, the seed-holding unit 250 defines two or more compartments in which different varieties of seeds can be placed. The particular arrangement illustrated in FIG. 21, however, should not be construed as limiting, as a wide variety of other distributions and aperture arrangements are possible (linear, random, circular, and other such arrangements).

As seen in FIG. 19, the downward-facing surface of the bottom portion 270 includes multiple apertures 272 arranged similarly as the apertures 262 of the top portion 260. The apertures 272 allow the fluid of the container in which the grass-growing device 200 is placed to better circulate through the seed-holding unit 250 and the seeds within the unit 250 to better absorb the nutrients in the fluid. The apertures 272 also allow for growth of roots downward and outward from the seeds in the seed-holding unit 250. In this manner, the seeds within the seed-holding unit 250 can be hydroponically grown in the grass-growing device 200. The circulation of fluid within the container facilitates growth of the grass from the seeds. The number, size, or location of the apertures 272 shown in FIG. 19 should not be construed as limiting, however, as the apertures 272 can be arranged differently or may be excluded altogether from the seed-holding unit 250.

The downward-facing surface of the bottom portion 270 further includes fastener arms (or tangs) 280 configured to removably affix the seed-holding unit 250 to the bottom of the basket 210. For example, in the second example embodiment, the fastener arms 280 comprise "snap-fit" fastener arms that frictionally engage the support bar 219 of the basket 210 when urged through the fastener-receiving apertures 224 of the support bar 219. As can be seen in FIG. 19, for example, the fastener arms 280 on the bottom portion 270 of the seed-holding unit 250 extend through the fastener-receiving apertures 224 and engage the bottom surface of the support bar 219 at protruding lip portions of the fastener arms 280, thereby securing the seed-holding unit 250 to the bottom of the basket 210. To remove the seed-holding unit 250, the fastener arms 280 can be urged toward each other, thereby disengaging the protruding lip portion of the fastener arms 280 from the support bar 219 and allowing the fastener arms 280 to be pushed through the fastener-receiving apertures 224. Alternatively, the seed-holding unit 250 attaches to the bottom and/or sides of the basket 210 using another mechanism or floats free in the basket 210.

Figure 22:
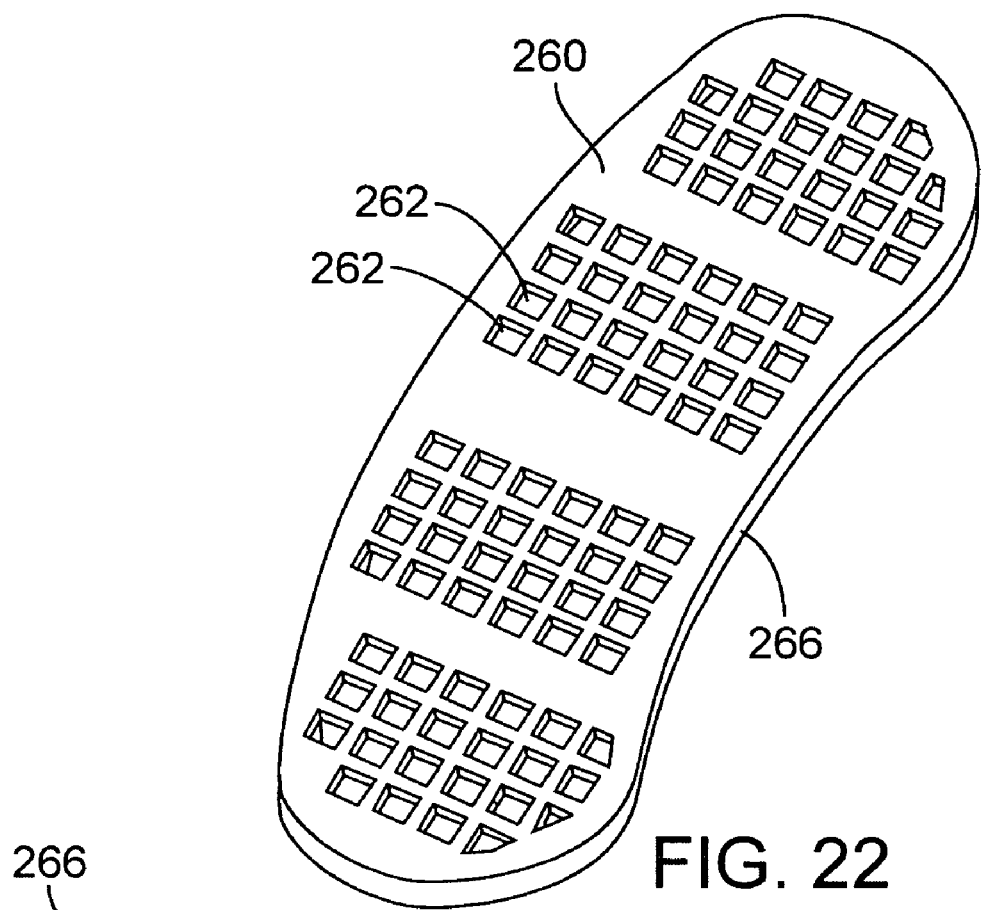
FIG. 22 is a perspective view of the top of a top portion of the seed-holding unit of the grass-growing device of FIG. 18.
Figure 23:
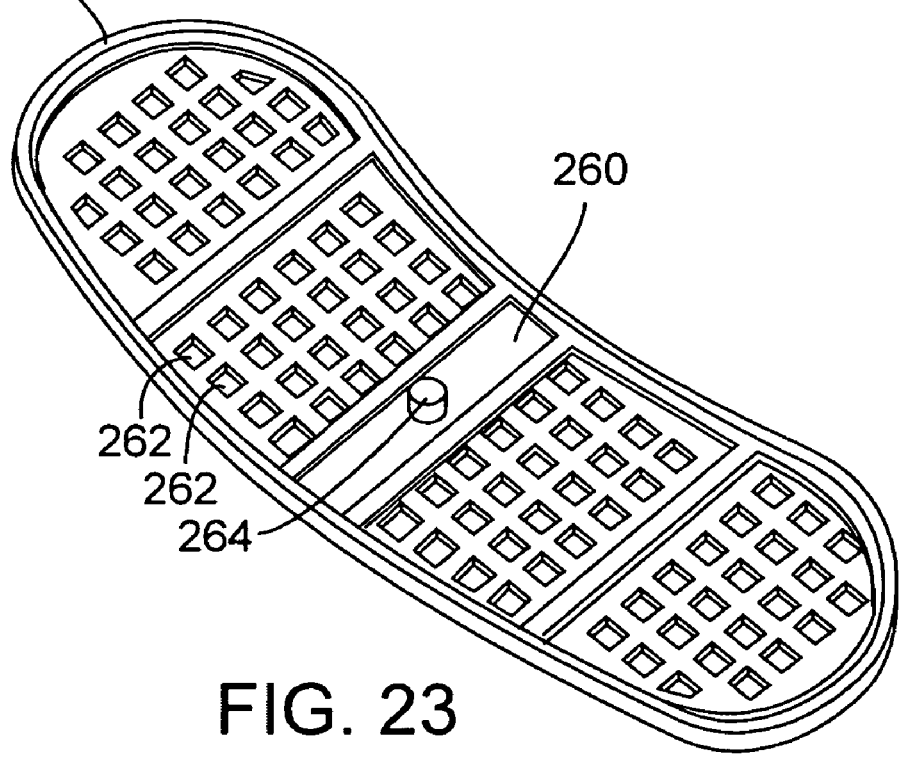
FIG. 23 is a perspective view of the bottom of the top portion of the seed-holding unit of the grass-growing device of FIG. 18.

FIG. 22 is a perspective view of the upward-facing surface of the top portion 260, whereas FIG. 23 is a perspective view of the downward-facing surface of the top portion 260. As seen in FIGS. 22 and 23, the top portion 260 includes a top-portion lip 266 along the circumferential edge of the top portion 260 that at least partially defines the interior of the seed-holding unit 250 when coupled to the bottom portion 270. As seen in FIG. 23, the top portion 260 further includes a post 264 used to couple the top portion 260 to the bottom portion 270.

Figure 24:
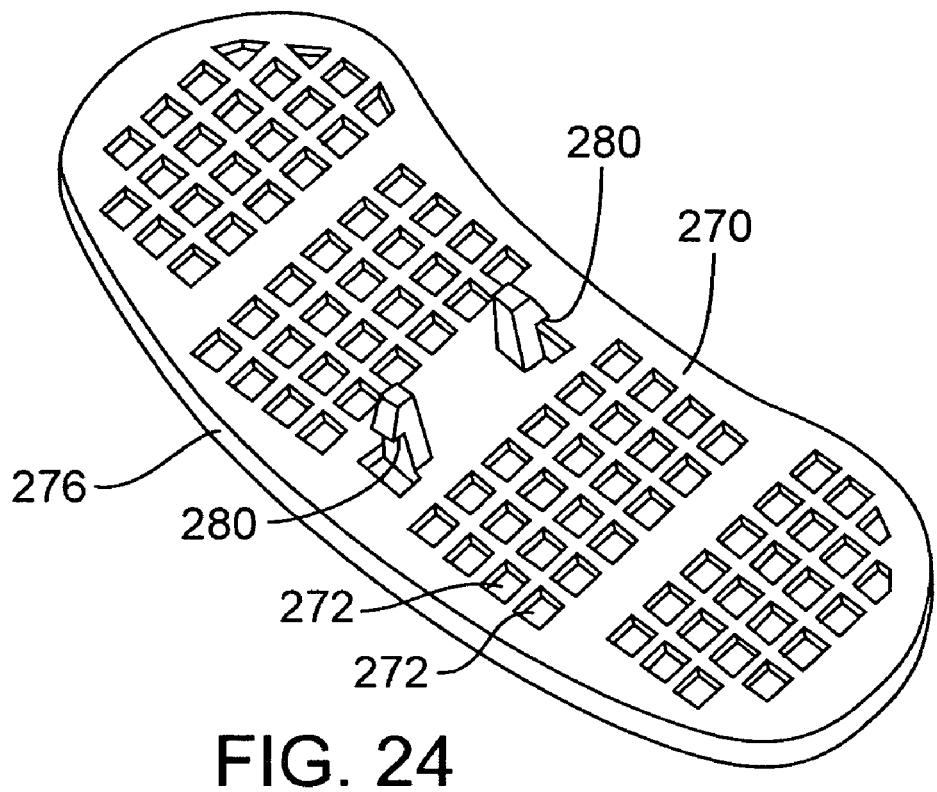
FIG. 24 is a perspective view of the bottom of the bottom portion of the seed-holding unit of the grass-growing device of FIG. 18.
Figure 25:
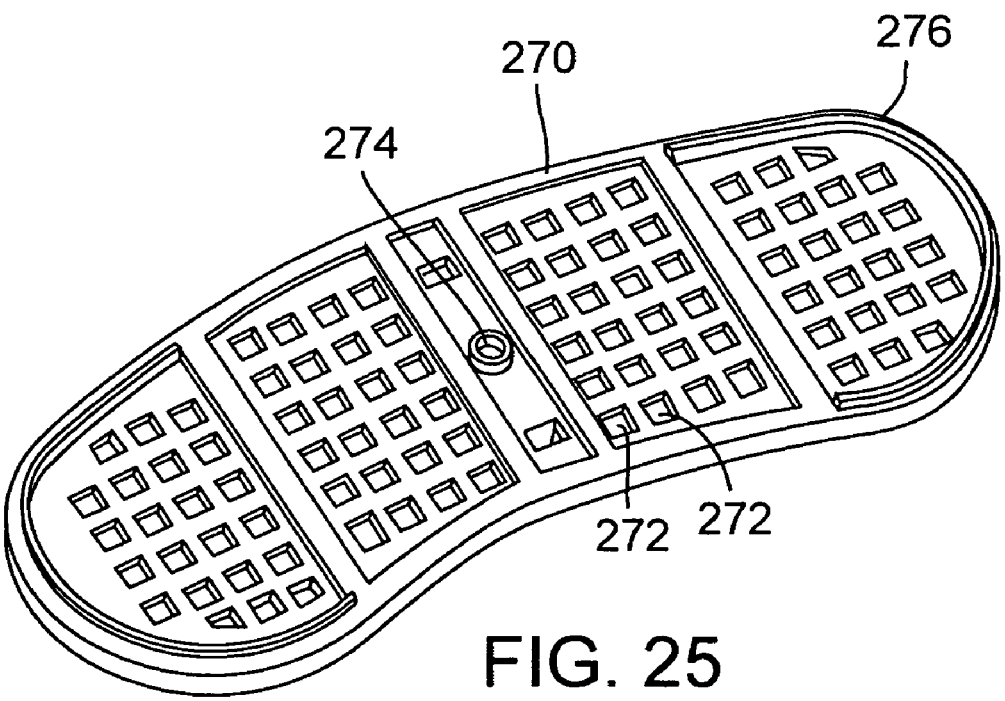
FIG. 25 is a perspective view of the top of the bottom portion of the seed-holding unit of the grass-growing device of FIG. 18.

FIG. 24 is a perspective view of the downward-facing surface of the bottom portion 270, whereas FIG. 25 is a perspective view of the upward-facing surface of the bottom portion 270. As seen in FIGS. 24 and 25, the bottom portion includes a bottom-portion lip 276 along the circumferential edge of the bottom portion 270 that at least partially defines the interior of the seed-holding unit 250 when the bottom portion 270 is coupled to the top portion 260. The bottom-portion lip 276 is configured to frictionally engage the interior of the top-portion lip 266, thereby forming a secure and tight fit between the two halves of the seed-holding unit 250. Alternatively, the top portion 260 and bottom portion 270 use another feature or no feature at all to define the interior of the seed-holding unit.

The upward-facing surface of the bottom portion 270 further includes an annular element 274 configured to receive and secure the post 264 of the top portion 260. Although the top portion 260 and the bottom portion 270 of the second exemplary embodiment are secured to one another via the post 264 and the annular element 274, the portions 260, 270 can be affixed to one another through a wide variety of fastening means. For example, the portions 260, 270 can be fastened together adhesively, with threaded or non-threaded fasteners, through a snap-fit mechanism, hinges, hooks, tongue-and-groove mechanisms, or other such mechanisms. In still other embodiments, the portions are not affixed to one another at all.

In other embodiments of the disclosed grass-growing device, the seeds are held within the basket by other seed-securing means. For example, a screen or other suitable barrier having one or more walls can be used to allow grass growth in the basket while preventing seeds from being pulled out of the basket. In certain embodiments, for instance, a perforated or meshed screen can be used. In such embodiments, the basket is configured to support and hold freely distributed seeds within the interior of the basket. The bottom of the basket may be solid, for instance, or comprise apertures configured to prevent seeds from falling through (for example, a perforated or meshed bottom). Any side apertures of the basket can be similarly dimensioned to prevent seeds from falling out of the basket. In these embodiments, the screen or barrier can be positioned over the seeds and secured within the basket through a suitable fastening mechanism (for example, frictionally secured to the basket through a snap-fit mechanism, collar, threaded fastener, or the like).

Figure 26:
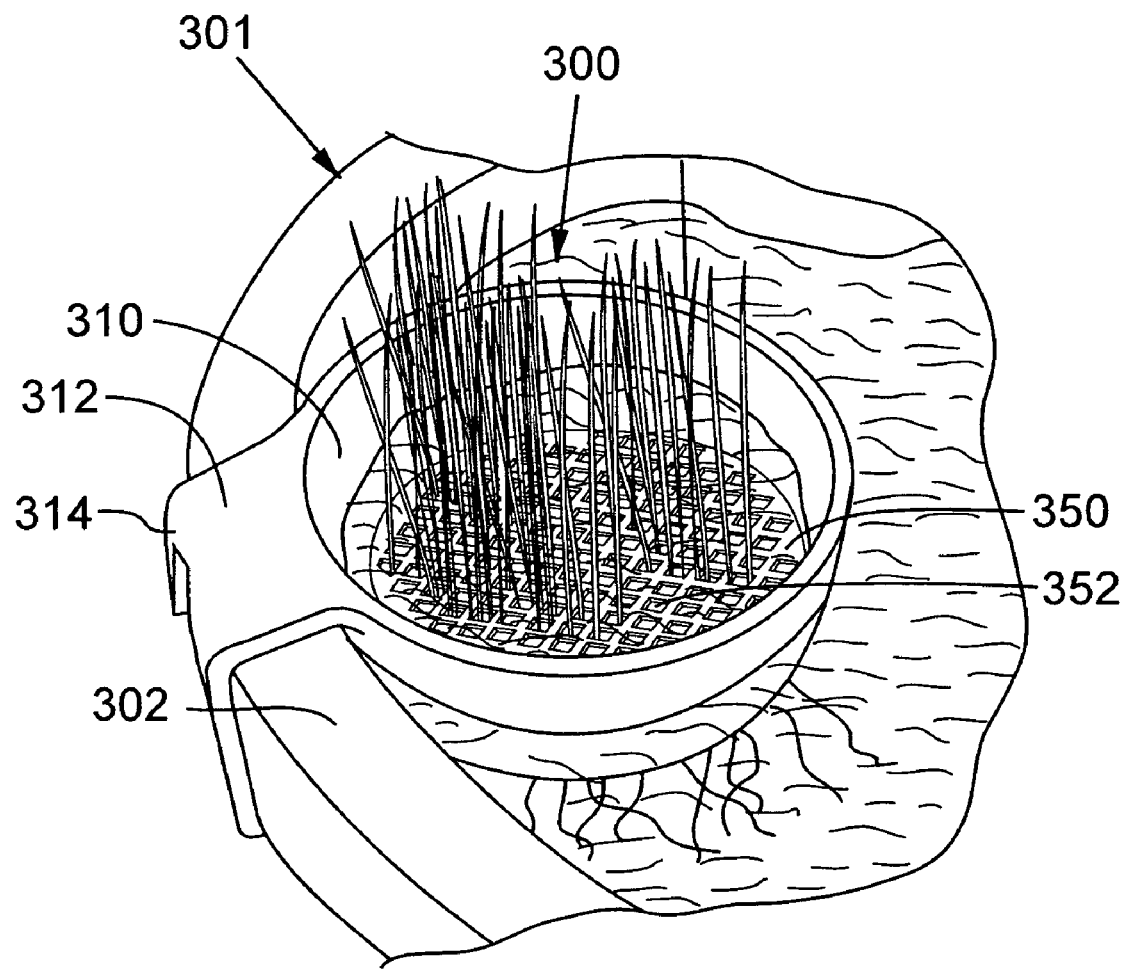
FIG. 26 is a perspective view of a third exemplary embodiment of a grass-growing device.

An example of an embodiment using a screen to secure seeds within the basket is shown in FIG. 26. In particular, FIG. 26 is a perspective view of a third exemplary embodiment of a grass-growing device 300 positioned on a rim 302 of a container 301 (here, a Drinkwell® pet fountain from Veterinary Ventures, Inc.). As seen in FIG. 26, the grass-growing device 300 comprises a basket (or receptacle) 310 having a generally circular shape. The basket 310 further comprises a projection 312 with a flange 314. The projection 312 and the flange 314 are configured to receive the rim 302 in a slot formed between the basket 310, the projection 312, and the flange 314. The projection 312 and the flange 314 can frictionally secure the basket 310 against the rim 302 so that the basket 310 is suspended in the circulating water of the container 301. For example, the flange may include a horizontal flange element with a projection configured to engage a lip or bottom edge of the container as described with respect to the first exemplary embodiment. Alternatively, any of the other attachment mechanisms described herein can be used. Grass grown from seeds within the basket 310 can also be seen in FIG. 26. In this third exemplary embodiment, the basket 310 is manufactured of plastic and, in certain implementations, includes one or more apertures on or near the bottom of the basket 310. For example, the bottom of the basket 310 can be perforated so as to allow water to circulate through the basket 310. In particular, the apertures can be dimensioned so as to permit fluid flow and to prevent the grass seeds held within the basket 310 from falling out. Further, the apertures can allow roots from the grass seeds to extend outwardly from the basket 310 (as shown in FIG. 26, for example).

In this third exemplary embodiment, a screen or other seed-securing element 350 is placed in the basket 310 on top of the grass seeds located therein. As illustrated in FIG. 26, the screen 350 can be meshed so as to form an array of apertures 352. The illustrated apertures 352 are configured to be large enough to allow leaves or blades of the grass to grow through, but small enough to prevent the seeds at the bottom of the basket 310 from being removed. Although not shown in the illustrated embodiment, the screen 350 can be securely fastened to the basket through a variety of different fastening mechanisms, or not fastened at all. For example, the screen 350 can be secured to the basket via a snap-fit mechanism, threaded or non-threaded fastener, or through adhesives. In the second example embodiment, the screen 350 is manufactured of rubber, but can be alternatively manufactured from a wide variety of materials (for example, plastic, polyethylene, polypropylene, or other such polymers).

Having illustrated and described the principles of the illustrated embodiments, it will be apparent to those skilled in the art that the embodiments can be modified in arrangement and detail without departing from such principles. For example, the disclosed grass-growing devices can be secured to the container through a variety of different fastening mechanisms (for example, through suction cups, adhesives, threaded and non-threaded fasteners, hooks, tongue-and-groove mechanisms, or other such mechanisms). Alternatively, the basket can be formed integrally within the container. For instance, in one implementation, the grass-growing basket is formed integrally within a pet fountain. Further, the basket need not be secured to the rim of the container, but may be secured to the bottom of the container, or may freely stand within the interior of the container. In still other embodiments, the basket is configured to float within the fluid of the container. In still other embodiments, at least a portion of the seed-holding unit is formed integrally within the basket. For example, the bottom portion of the seed-holding unit may be formed within the basket, whereas the top portion may be removable so that new ungrown seeds can be added to the seed-holding unit. Or, all portions of the seed-holding unit can be formed integrally within the basket so that the entire device comprises a single integral unit.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A watering device for simultaneously hydrating an animal and growing plants, the device comprising:
   a plurality of seeds at least some of which collectively provide an average seed thickness;
   a container having an open upper end portion, which defines an opening in the container, a bottom wall, and one or more curved sidewalls that extend outwardly from the bottom wall and terminate at the open upper end portion to define a container interior;
   a basket having (i) opposing first and second sidewalls defining a basket interior and (ii) one or more basket apertures penetrating the basket in open fluid communication with the basket interior; a majority of a bottom portion of the basket being open between the opposing first and second sidewalls of the basket; the basket bottom portion including a support bar that extends between the opposing first and second sidewalls of the basket; the basket being secured to the container and at least partially disposed within the container interior; the basket occupying a minority of the container interior to define an open, animal hydrating portion of the open upper end portion of the container; the opposing first and second sidewalls of the basket having curved shapes that approximate the shape of at least a portion of the one or more curved sidewalls of the container, whereby the first sidewall of the basket fits closely adjacent at least a portion of the one or more curved sidewalls of the container and the opposing, second sidewall of the basket curves in the same direction as the first sidewall of the basket; whereby intrusion into the animal hydrating portion of the upper end portion of the container is minimized; the animal hydrating portion being sized to permit access to the container interior by the animal; and
   a seed-holding unit, having (i) a top wall spaced from a bottom wall by one or more side-walls to define an open seed-holding unit interior in the seed holding unit, the top wall being secured with at least one of the one or more sidewalls, and (ii) a plurality of seed-holding unit apertures penetrating the top wall in open fluid communication with the seed-holding unit interior and having a width less than the average seed thickness; the seed-holding unit being at least partially disposed within the basket interior and the container interior; the seed-holding unit being removably attachable to the support bar via a mechanical engagement between the support bar and the seed-holding unit;
   the plurality of seeds being disposed within the seed-holding unit interior.

2. The device of claim 1, further comprising a water circulation unit in open fluid communication with the container interior; the seed-holding unit interior, basket interior, and container interior being at least partially fillable with circulating water; the water circulation unit being oriented to direct the circulating water to a spout positioned above the open upper end portion of the container, whereby the circulating water free falls from the spout to the animal hydrating portion of the open upper end portion of the container.

3. The device of claim 1, wherein the basket comprises a projection and a flange extending from an upper end portion of the basket and defining a slot removably engaging an upper end portion of at least one of the one or more sidewalls of the container.

4. The device of claim 3, wherein the flange includes a protrusion engaging a lip or bottom edge of the container.

5. The device of claim 1, wherein at least a portion of the seed-holding unit is integrally formed within the basket.

6. The device of claim 1, wherein the seed-holding unit is removably mounted to the basket.

7. The device of claim 1, wherein the mechanical engagement between the support bar and the seed-holding unit includes a snap-fit mechanism between the support bar and the seed-holding unit.

8. The device of claim 1, wherein the basket is at least partially formed from a flexible fabric-like material.

9. The device of claim 1, wherein the seed-holding unit is at least partially formed from a flexible fabric-like material.

10. The device of claim 1, wherein the seed-holding unit interior is at least partially filled with water hut is substantially devoid of particulate growing media.

11. The device of claim 1, wherein the seeds are for kitty grass.

12. A watering device for simultaneously hydrating an animal and growing plants, the device comprising:
   a plurality of seeds at least some of which collectively provide an average seed thickness;
   a container having an open upper end portion, a bottom wall, and a curved sidewall that extends outwardly from the bottom wall and terminates at the open upper end portion to define a container interior;
   a water circulation unit having an inlet in open fluid communication with the container interior and an outlet that is in fluid communication with a spout that is positioned above the container interior, whereby water moves from the container interior, through the water circulation unit, out the spout and free falls into the container interior;
   a basket having (i) opposing first and second sidewalls defining a basket interior and (ii) one or more basket apertures penetrating the basket in open fluid communication with the basket interior; the basket being at least partially disposed within the container interior; the opposing first and second sidewalls of the basket having complementary curved shapes that approximate the shape of the at least one curved sidewall of the container, whereby the first sidewall of the basket fits closely adjacent the at least one curved sidewall of the container and the opposing, second sidewall of the basket curves in the same direction as the first sidewall of the basket and the at least one curved sidewall of the container, whereby intrusion into an animal hydrating portion of the upper end portion of the container is minimized; a majority of a bottom portion of the basket being open between the opposing first and second sidewalls of the basket; the basket bottom including a support bar that extends between the opposing first and second sidewalls of the basket; and a seed-holding unit, having (i) a top wall spaced from a bottom wall by one or more sidewalls to define an open seed-holding unit interior in the seed holding unit, and (ii) a plurality of seed-holding unit apertures penetrating the top wall in open fluid communication with the seed-holding unit interior and having a width less than the average seed thickness; the seed-holding unit being shaped to closely approximate a shape of the basket interior and at least partially disposed within the basket interior and the container interior; the seed-holding unit interior, basket interior, and container interior being at least partially fillable with circulating water within the container interior; the seed-holding unit being removably attachable to the support bar via a mechanical engagement between the support bar and the seed-holding unit;

the basket occupying a portion of the open upper end portion of the container interior to define the animal hydrating portion of the open upper end portion of the container; the animal hydrating portion being sized to permit access to the container interior by the animal; the spout being positioned such that the water free falls into the animal hydrating portion of the upper end portion of the container;

the plurality of seeds being disposed within the seed-holding unit interior.

13. The device of claim 12, further comprising a filter associated with the water circulation unit between the inlet and the outlet of the water circulation unit.

14. The device of claim 13, wherein the seed-holding unit interior is at least partially filled with water but is substantially devoid of particulate growing media.

15. The device of claim 14, wherein the seed-holding unit is removably attachable to a bottom of the basket via a snap-fit mechanism between the basket and the seed-holding unit.

* * * * *